United States Patent
Wu et al.

(10) Patent No.: US 10,472,063 B2
(45) Date of Patent: Nov. 12, 2019

(54) SYSTEMS AND METHODS FOR FOLDABLE ARMS

(71) Applicant: SZ DJI TECHNOLOGY CO., LTD., Shenzhen (CN)

(72) Inventors: Xumin Wu, Shenzhen (CN); Xiaolong Wu, Shenzhen (CN); Sungki Lee, Shenzhen (CN); Jiyuan Ao, Shenzhen (CN); Zhuang Feng, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/260,828

(22) Filed: Jan. 29, 2019

(65) Prior Publication Data

US 2019/0152599 A1  May 23, 2019

Related U.S. Application Data

(63) Continuation of application No. 15/889,881, filed on Feb. 6, 2018, now Pat. No. 10,202,191, which is a
(Continued)

(51) Int. Cl.
*B64C 29/00* (2006.01)
*B64C 39/02* (2006.01)
(Continued)

(52) U.S. Cl.
CPC .............. *B64C 39/024* (2013.01); *B64C 1/30* (2013.01); *B64C 27/08* (2013.01); *B64C 27/12* (2013.01);
(Continued)

(58) Field of Classification Search
CPC ........ B64C 2201/108; B64C 2201/027; B64C 2201/042; B64C 2201/201
See application file for complete search history.

(56) References Cited

U.S. PATENT DOCUMENTS 3,053,480 A  9/1962 Vanderlip
8,052,081 B2  11/2011 Olm et al.
(Continued)

FOREIGN PATENT DOCUMENTS

CA  2876630 A1  7/2016
CN  201793017 U  4/2011
(Continued)

OTHER PUBLICATIONS

Anonymous. Post on dronevibes.com. <https://www.dronevibes.com/forums/threads/gryphon-dynamics-distributor.20113/>. Posted on May 19, 2014. (Year: 2014).*
(Continued)

*Primary Examiner* — Brian M O'Hara
*Assistant Examiner* — Michael B. Kreiner
(74) *Attorney, Agent, or Firm* — Anova Law Group, PLLC

(57) ABSTRACT

An unmanned aerial vehicle (UAV) includes a central body, a plurality of arms extending out from the central body, and a plurality of propulsion units. Each of the plurality of arms includes a stem portion, one or more branch portions, and a joint connecting the stem portion with the one or more branch portions. The joint includes a sleeve configured to lock a position of one of the one or more branch portions relative to the stem portion. Each of the propulsion units is attached to one of the one or more branch portions of one of the plurality of arms.

20 Claims, 21 Drawing Sheets

Related U.S. Application Data continuation of application No. 15/336,584, filed on Oct. 27, 2016, now Pat. No. 9,914,537, which is a continuation of application No. PCT/CN2015/080528, filed on Jun. 1, 2015.

(51) Int. Cl.
*B64C 27/08* (2006.01)
*B64C 27/12* (2006.01)
*B64D 47/08* (2006.01)
*B64C 1/30* (2006.01)

(52) U.S. Cl.
CPC ........ B64D 47/08 (2013.01); *B64C 2201/027* (2013.01); *B64C 2201/042* (2013.01); *B64C 2201/108* (2013.01); *B64C 2201/12* (2013.01); *B64C 2201/201* (2013.01)

(56) References Cited

U.S. PATENT DOCUMENTS

| | | | |
|---|---|---|---|
| 8,292,215 | B2 | 10/2012 | Olm et al. |
| 8,453,962 | B2 | 6/2013 | Shaw |
| 9,004,973 | B2 | 4/2015 | Condon et al. |
| 9,051,050 | B2 | 6/2015 | Achtelik et al. |
| 9,260,184 | B2 | 2/2016 | Olm et al. |
| 9,272,784 | B2 | 3/2016 | Nelson |
| 9,527,588 | B1 | 12/2016 | Rollefstad |
| 9,573,683 | B2 | 2/2017 | Martin et al. |
| 9,599,992 | B2 | 3/2017 | Kohstall |
| 9,676,477 | B1 * | 6/2017 | Kimchi .................. B64C 27/00 |
| 9,764,835 | B1 | 9/2017 | Kimchi et al. |
| 10,093,416 | B2 * | 10/2018 | Alnafisah .............. B64C 39/024 |
| 2010/0044499 | A1 | 2/2010 | Dragan et al. |
| 2011/0226892 | A1 | 9/2011 | Crowther et al. |
| 2013/0206915 | A1 | 8/2013 | Desaulniers |
| 2015/0012154 | A1 | 1/2015 | Senkel et al. |
| 2015/0259066 | A1 | 9/2015 | Johannesson et al. |
| 2016/0130000 | A1 | 5/2016 | Rimanelli |
| 2016/0159471 | A1 | 6/2016 | Chan et al. |
| 2016/0176520 | A1 | 6/2016 | Goldstein |
| 2016/0214713 | A1 | 7/2016 | Cragg |
| 2016/0340028 | A1 | 11/2016 | Datta |
| 2017/0036771 | A1 | 2/2017 | Woodman et al. |
| 2017/0217599 | A1 * | 8/2017 | Peng ..................... B64C 25/08 |

FOREIGN PATENT DOCUMENTS

| | | | | |
|---|---|---|---|---|
| CN | 101992854 | B | 11/2012 | |
| CN | 203005749 | U | 6/2013 | |
| CN | 203294313 | U | 11/2013 | |
| CN | 103979107 | A | 8/2014 | |
| CN | 203937860 | U | 11/2014 | |
| CN | 204223178 | U | 3/2015 | |
| CN | 204341393 | U | 5/2015 | |
| EP | 3275784 | A4 * | 1/2019 | ........... B64C 39/024 |
| FR | 2909972 | B1 | 10/2009 | |
| GB | 781356 | A | 8/1957 | |
| JP | H1159595 | A | 3/1999 | |
| JP | 2006141220 | A | 6/2006 | |
| WO | 2014059549 | A1 | 4/2014 | |
| WO | 2014075609 | A1 | 5/2014 | |

OTHER PUBLICATIONS

"Gryphon Dynamics GD-8: Assembly Instructions." Nov. 2013. Retrieved from www.gryphondynamics.co.kr. 12pp.

Coxworth. HorseFly delivery drone would use a van as its base-on-the-go. Gizmag. Jun. 6, 2014. http://www.gizmag.com/horsefly-uav-delivery-drone/32441/.

Gryphon dynamics. OCTO-copters. Accessed Jun. 11, 2015. http://gryphondynamics.co.kr/octo-copters-type.

In agricultural machinery 3WFD-10 multi-rotor UAV. China National Construction & Agricultural Mechinery Import & Export Corporation (CAMC). Updated Apr. 14, 2015. http://www.nongji360.com/company/shop2/product_3143_459212.shtml.

MEDICI. New Postal Service fleet could include drones. Federal Times. Apr. 31, 2015. http://www.usatoday.com/story/tech/2015/04/21/postal-service-drones/26141077/.

Tarot TL100B17 3-blade Clover Folding Propeller Clamp Props for RC Drone UAV Aircraft Quadcopter Hexacopter DIY (Red). DroneParts. Accessed Apr. 29, 2015. http://drone.parts/store/product/tarot-tl100b17-3-blade-clover-folding-propeller-clamp-props-for-rc-drone-uav-aircraft-quadcopter-hexacopter-diy-red/.

Tarot X8 8-Axis Octacopter Umbrella Type TL8X000 Aircraft Drone UAV With Electronic Retractable Landing Skid for FPV. Accessed Apr. 29, 2015. http://www.amazon.com/Tarot-Octacopter-Umbrella-Electronic-Retractable/dp/B00S7MJAXQ.

Turbo Ace Cinewing 8E Octocopter Options: (V2/A2, Singe/Dual Operators, RetSkid/DetTrack, FPV, Battery, Charger, Trainer). Accessed Jun. 11, 2015. http://www.turboace.com/turboacecinewing-8eoctocopterrtftxandrxopt50framedjia248mmmotors17carbonpropsretractableskiddetachabletrackbatteries. aspx.

Turbo Ace X88-J2 Octocopter C-RTF, Devo10 & DSLR Camera Mount: DJI WK-M, GPS, Foldable, Telemetry, Carbon Prop, 6.5LB Payload. Accessed Jun. 11, 2015. http://www.turboace.com/turboacex88-i2octocopterrtfwdevo10foldable6poundpayloadtelemetrydjiwk-mgpscarefreemodesblmotors35aes.aspx.

The World Intellectual Property Organization (WIPO) International Search Report with Written Opinion for PCT/CN2015/080528 dated Mar. 8, 2016.

* cited by examiner

SYSTEMS AND METHODS FOR FOLDABLE ARMS

CROSS-REFERENCE

This application is a continuation of application Ser. No. 15/889,881, filed on Feb. 6, 2018, which is a continuation of application Ser. No. 15/336,584, filed on Oct. 27, 2016, now U.S. Pat. No. 9,914,537, which is a continuation of International Application No. PCT/CN2015/080528, filed Jun. 1, 2015, the disclosures of all of which are incorporated herein by reference in their entirety.

BACKGROUND OF THE DISCLOSURE

Aerial vehicles such as unmanned aerial vehicles (UAVs) can be used for monitoring and maintaining one or more agricultural crops. Such aerial vehicles may carry a payload that includes one or more agricultural products to be delivered to the one or more agricultural crops.

Agricultural environments can be dirty environments with poor air quality. In some cases loose dirt can be suspended in the air in an agricultural area. Pollen from crops can also increase the particulate load on the ambient air in an agricultural environment. Additionally, agricultural products such as water, seeds, pesticides, and fertilizer can be present in the air in an agricultural environment. The poor air quality can negatively affect one or more systems on board the UAV.

In some cases, agricultural UAV's can be large in order to carry heavy loads of agricultural products. The large UAVs can be cumbersome for transport by human users and in some cases may require specialized equipment for transport.

SUMMARY OF THE DISCLOSURE

A need exists for systems and methods for providing an unmanned aerial vehicle (UAV) that can operate in a dirty agricultural environment without exposing sensitive equipment and systems to the dirty air. Furthermore, the UAV needs to have a compact size that can easily be transported while still having sufficient strength to transport large volumes of agricultural products. Provided herein is a transformable UAV that can be transformed to a compacted state for transport and to an extended state for use. The UAV comprises a plurality of foldable arms that can be compacted and extended to alter the size of the UAV. Furthermore the arms may be sealed from liquid and ambient air such that dirty air in the agricultural environment cannot enter one or more internal spaces of the UAV. The UAV further comprises an on-board air purification and cooling system to deliver clean cool air to prevent one or more rotors of the UAV from overheating.

In an aspect of the disclosure, an unmanned aerial vehicle (UAV) may comprise a central body; a plurality of arms that extend out from the central body, each arm having one or more joints that segment the arm into a stem portion proximal to the central body and one or more branch portions distal to the central body, wherein the one or more joints permit the one or more branch portions to move horizontally relative to the stem portion; and a plurality of rotors, each rotor in the plurality attached to the one or more branch portions.

The UAV can comprise a payload. The payload can be an imaging device. The payload can be a tank that holds a liquid volume. The liquid can be water. The liquid can be pesticide. The tank can have a nozzle that permits the liquid volume to be sprayed out of the tank. The payload can be carried beneath the central body of the UAV. The payload can be carried beneath the plurality of arms. The payload can be carried on a landing support of the UAV. The plurality of arms can include at least four arms. The plurality of arms can include at least two arms. Each of the plurality of arms can support at least two rotor blades.

Each arm can have a joint connected to the stem portion and at least two branch portions connected to the joint. The one or more branch portions can move relative to the stem portion between an extended state and a compacted state. In some cases, an angle between a branch portion and the stem portion can be greater than 90 degrees when the branch portion is in the extended state. An angle between a branch portion and the stem portion can be less than or equal to 90 degrees when the branch portion is in the compacted state. An angle between a branch portion and the stem portion when the branch portion is in an extended state can be greater than an angle between a branch portion and the stem portion when the branch portion is in the compacted state. A distance from the central body to a rotor supported by a branch portion in the extended state can be greater than a distance from the central body to the rotor supported by the branch portion in the compacted state. The one or more branch portions can include at least two branch portions that form a Y-shape with the stem portion when the branch portions are in the extended state. Alternatively the branch portions can form any other shapes, such as a V-shape, a U-shape, or a T-shape with the stem portion in the extended state. Movement of the one or more branch portions between the extended state and the compacted state may not include any vertical motion relative to the central body. Movement of the one or more branch portions between the extended state and the compacted state may include less than a 5 degree range of vertical motion relative to the central body. Movement of the one or more branch portions between the extended state and the compacted state may include vertical motion relative to the central body. Movement of the one or more branch portions between the extended state and the compacted state may include lateral motion relative to the central body.

The one or more joints may lock a position of the branch portion relative to the stem portion in the extended state. The one or more joints may use a threaded connection mechanism to lock the position of the branch portion. The one or more joints may use a positioning pin to lock the position of the branch portion. The positioning pin may pass through the branch portion and the joint.

The one or more joints may each comprise a seal that isolates an inner portion of the joint from an ambient environment in the extended state. The seal can be an air tight seal. The seal can be a water tight seal. The one or more branch portions can move relative to the stem portion between the extended state and the compacted state with aid of manual contact from a user. The one or more branch portions may move relative to the stem portion between the extended state and the compacted state in response to an electronic signal to change configuration. The electronic signal may originate from on-board the UAV. The electronic signal may originate from off-board the UAV. The one or more joints may include at least one pivot region that allows a branch portion to pivot about an axis with respect to the stem portion. The one or more joints may include a first pivot region that allows a first branch portion to pivot about an axis with respect to the stem portion and a second pivot region that allows a second branch portion to pivot about an axis with respect to the stem portion. Each arm in the plurality of arms can be formed from a composite tube. The composite tube can be a carbon fiber tube. Each rotor can comprise one or more shafts to accept one or more blade. Each rotor can comprise two or more blades. The rotor can comprise two or more shafts, each shaft configured to accept a blade. The two or more blades can be movable independently of one another. The two or more blades can be moveable relative to one another. The transformable aerial vehicle can weigh less than about 5 kg.

In an aspect of the disclosure, a method of operating an unmanned aerial vehicle (UAV) can comprise providing the UAV described herein and providing energy to the plurality of rotors, thereby generating lift for the UAV.

In another aspect of the disclosure, a method of changing a configuration of an unmanned aerial vehicle (UAV) can comprise: (1) providing a UAV comprising a central body, a plurality of arms that extend out from the central body and each arm having one or more joints that segment the arm into a stem portion proximal to the central body and one or more branch portions distal to the central body, and a plurality of rotors and each rotor in the plurality attached to the one or more branch portions; and (2) moving the one or more branch portions horizontally relative to the stem portion at the one or more joints.

The UAV can comprise a payload. The payload can be an imaging device. The payload can be a tank that holds a liquid volume. The liquid can be water. The liquid can be pesticide. The tank can have a nozzle that permits the liquid volume to be sprayed out of the tank. The payload can be carried beneath the central body of the UAV. The payload can be carried beneath the plurality of arms. The payload can be carried on a landing support of the UAV. The plurality of arms can include at least four arms. The plurality of arms can include at least two arms. Each of the plurality of arms can support at least two rotor blades.

Each arm can have a joint connected to the stem portion and at least two branch portions connected to the joint. The one or more branch portions can move relative to the stem portion between an extended state and a compacted state. In some cases, an angle between a branch portion and the stem portion can be greater than 90 degrees when the branch portion is in the extended state. An angle between a branch portion and the stem portion can be less than or equal to 90 degrees when the branch portion is in the compacted state. An angle between a branch portion and the stem portion when the branch portion is in an extended state can be greater than an angle between a branch portion and the stem portion when the branch portion is in the compacted state. A distance from the central body to a rotor supported by a branch portion in the extended state can be greater than a distance from the central body to the rotor supported by the branch portion in the compacted state. The one or more branch portions can include at least two branch portions that form a Y-shape with the stem portion when the branch portions are in the extended state. Movement of the one or more branch portions between the extended state and the compacted state may not include any vertical motion relative to the central body. Movement of the one or more branch portions between the extended state and the compacted state may include less than a 5 degree range of vertical motion relative to the central body. Movement of the one or more branch portions between the extended state and the compacted state may include vertical motion relative to the central body. Movement of the one or more branch portions between the extended state and the compacted state may include lateral motion relative to the central body.

The one or more joints may lock a position of the branch portion relative to the stem portion in the extended state. The one or more joints may use a threaded connection mechanism to lock the position of the branch portion. The one or more joints may use a positioning pin to lock the position of the branch portion. The positioning pin may pass through the branch portion and the joint.

The one or more joints may each comprise a seal that isolates an inner portion of the joint from an ambient environment in the extended state. The seal can be an air tight seal. The seal can be a water tight seal. The one or more branch portions can move relative to the stem portion between the extended state and the compacted state with aid of manual contact from a user. The one or more branch portions may move relative to the stem portion between the extended state and the compacted state in response to an electronic signal to change configuration. The electronic signal may originate from on-board the UAV. The electronic signal may originate from off-board the UAV. The one or more joints may include at least one pivot region that allows a branch portion to pivot about an axis with respect to the stem portion. The one or more joints may include a first pivot region that allows a first branch portion to pivot about an axis with respect to the stem portion and a second pivot region that allows a second branch portion to pivot about an axis with respect to the stem portion. Each arm in the plurality of arms can be formed from a composite tube. The composite tube can be a carbon fiber tube. Each rotor can comprise one or more shafts to accept one or more blade. Each rotor can comprise two or more blades. The rotor can comprise two or more shafts, each shaft configured to accept a blade. The two or more blades can be movable independently of one another. The two or more blades can be moveable relative to one another. The transformable aerial vehicle can weigh less than about 5 kg.

In another aspect of the disclosure, a kit for assembling an unmanned aerial vehicle (UAV), can comprise a plurality of arm components including: one or more stem portions, one or more branch portions configured to attach to one or more rotors, one or more joints configured to (1) connect the one or more stem portions with the one or more branch portions, and (2) permit the one or more branch portions to move relative to the one or more stem portions, and instructions comprising information for a user of said UAV to assembly component(s) of (a), such that when the UAV is assembled, the assembled UAV is characterized in that it comprises: a central body; a plurality of arms that extend out from the central body, each arm having the one or more joints that segment the arm into the stem portion proximal to the central body and one or more branch portions distal to the central body, wherein the one or more joints permit the one or more branch portions to move horizontally relative to the stem portion; and the plurality of rotors, each rotor in the plurality attached to the one or more branch portions. The kit can further comprise a plurality of rotors, each rotor in the plurality configured to be attached to the one or more branch portions The UAV can comprise a payload. The payload can be an imaging device. The payload can be a tank that holds a liquid volume. The liquid can be water. The liquid can be pesticide. The tank can have a nozzle that permits the liquid volume to be sprayed out of the tank. The payload can be carried beneath the central body of the UAV. The payload can be carried beneath the plurality of arms. The payload can be carried on a landing support of the UAV. The plurality of arms can include at least four arms. The plurality of arms can include at least two arms. Each of the plurality of arms can support at least two rotor blades.

Each arm can have a joint connected to the stem portion and at least two branch portions connected to the joint. The one or more branch portions can move relative to the stem portion between an extended state and a compacted state. In some cases, an angle between a branch portion and the stem portion can be greater than 90 degrees when the branch portion is in the extended state. An angle between a branch portion and the stem portion can be less than or equal to 90 degrees when the branch portion is in the compacted state. An angle between a branch portion and the stem portion when the branch portion is in an extended state can be greater than an angle between a branch portion and the stem portion when the branch portion is in the compacted state. A distance from the central body to a rotor supported by a branch portion in the extended state can be greater than a distance from the central body to the rotor supported by the branch portion in the compacted state. The one or more branch portions can include at least two branch portions that form a Y-shape with the stem portion when the branch portions are in the extended state. Movement of the one or more branch portions between the extended state and the compacted state may not include any vertical motion relative to the central body. Movement of the one or more branch portions between the extended state and the compacted state may include less than a 5 degree range of vertical motion relative to the central body. Movement of the one or more branch portions between the extended state and the compacted state may include vertical motion relative to the central body. Movement of the one or more branch portions between the extended state and the compacted state may include lateral motion relative to the central body.

The one or more joints may lock a position of the branch portion relative to the stem portion in the extended state. The one or more joints may use a threaded connection mechanism to lock the position of the branch portion. The one or more joints may use a positioning pin to lock the position of the branch portion. The positioning pin may pass through the branch portion and the joint.

The one or more joints may each comprise a seal that isolates an inner portion of the joint from an ambient environment in the extended state. The seal can be an air tight seal. The seal can be a water tight seal. The one or more branch portions can move relative to the stem portion between the extended state and the compacted state with aid of manual contact from a user. The one or more branch portions may move relative to the stem portion between the extended state and the compacted state in response to an electronic signal to change configuration. The electronic signal may originate from on-board the UAV. The electronic signal may originate from off-board the UAV. The one or more joints may include at least one pivot region that allows a branch portion to pivot about an axis with respect to the stem portion. The one or more joints may include a first pivot region that allows a first branch portion to pivot about an axis with respect to the stem portion and a second pivot region that allows a second branch portion to pivot about an axis with respect to the stem portion. Each arm in the plurality of arms can be formed from a composite tube. The composite tube can be a carbon fiber tube. Each rotor can comprise one or more shafts to accept one or more blade. Each rotor can comprise two or more blades. The rotor can comprise two or more shafts, each shaft configured to accept a blade. The two or more blades can be movable independently of one another. The two or more blades can be moveable relative to one another. The transformable aerial vehicle can weigh less than about 5 kg.

In another aspect of the disclosure, an arm configured to support a propulsion unit of an unmanned aerial vehicle (UAV) can comprise a stem portion configured to be proximal to a central body of the UAV when the arm is connected to the UAV; one or more branch portions configured to be distal to the central body when the arm is connected to the UAV; one or more joints configured to connect the stem portion with the one or more branch portions, wherein the one or more joints permit the one or more branch portions to move horizontally relative to the stem portion when the arm is connected to the UAV; and the propulsion unit, attached to the one or more branch portions.

The UAV can comprise a payload. The payload can be an imaging device. The payload can be a tank that holds a liquid volume. The liquid can be water. The liquid can be pesticide. The tank can have a nozzle that permits the liquid volume to be sprayed out of the tank. The payload can be carried beneath the central body of the UAV. The payload can be carried beneath the plurality of arms. The payload can be carried on a landing support of the UAV. The arm can support at least two rotor blades.

Each arm can have a joint connected to the stem portion and at least two branch portions connected to the joint. The one or more branch portions can move relative to the stem portion between an extended state and a compacted state. In some cases, an angle between a branch portion and the stem portion can be greater than 90 degrees when the branch portion is in the extended state. An angle between a branch portion and the stem portion can be less than or equal to 90 degrees when the branch portion is in the compacted state. An angle between a branch portion and the stem portion when the branch portion is in an extended state can be greater than an angle between a branch portion and the stem portion when the branch portion is in the compacted state. A distance from the central body to a rotor supported by a branch portion in the extended state can be greater than a distance from the central body to the rotor supported by the branch portion in the compacted state. The one or more branch portions can include at least two branch portions that form a Y-shape with the stem portion when the branch portions are in the extended state. Movement of the one or more branch portions between the extended state and the compacted state may not include any vertical motion relative to the central body. Movement of the one or more branch portions between the extended state and the compacted state may include less than a 5 degree range of vertical motion relative to the central body. Movement of the one or more branch portions between the extended state and the compacted state may include vertical motion relative to the central body. Movement of the one or more branch portions between the extended state and the compacted state may include lateral motion relative to the central body.

The one or more joints may lock a position of the branch portion relative to the stem portion in the extended state. The one or more joints may use a threaded connection mechanism to lock the position of the branch portion. The one or more joints may use a positioning pin to lock the position of the branch portion. The positioning pin may pass through the branch portion and the joint.

The one or more joints may each comprise a seal that isolates an inner portion of the joint from an ambient environment in the extended state. The seal can be an air tight seal. The seal can be a water tight seal. The one or more branch portions can move relative to the stem portion between the extended state and the compacted state with aid of manual contact from a user. The one or more branch portions may move relative to the stem portion between the extended state and the compacted state in response to an electronic signal to change configuration. The electronic signal may originate from on-board the UAV. The electronic signal may originate from off-board the UAV. The one or more joints may include at least one pivot region that allows a branch portion to pivot about an axis with respect to the stem portion. The one or more joints may include a first pivot region that allows a first branch portion to pivot about an axis with respect to the stem portion and a second pivot region that allows a second branch portion to pivot about an axis with respect to the stem portion. The arm can be formed from a composite tube. The composite tube can be a carbon fiber tube. Each propulsion unit can comprise one or more shafts to accept one or more blade. Each propulsion unit can comprise two or more blades. The propulsion unit can comprise two or more shafts, each shaft configured to accept a blade. The two or more blades can be movable independently of one another. The two or more blades can be moveable relative to one another. The transformable aerial vehicle can weigh less than about 5 kg.

In another aspect of the disclosure an unmanned aerial vehicle (UAV) can comprise: a central body; a plurality of arms that extend out from the central body, each arm having one or more joints that segment the arm into a stem portion proximal to the central body and one or more branch portions distal to the central body, wherein the one or more branch portions move horizontally relative to the central body without the stem portion moving relative to the central body; and a plurality of rotors, each rotor in the plurality attached to the one or more branch portions.

The UAV can comprise a payload. The payload can be an imaging device. The payload can be a tank that holds a liquid volume. The liquid can be water. The liquid can be pesticide. The tank can have a nozzle that permits the liquid volume to be sprayed out of the tank. The payload can be carried beneath the central body of the UAV. The payload can be carried beneath the plurality of arms. The payload can be carried on a landing support of the UAV. The plurality of arms can include at least four arms. The plurality of arms can include at least two arms. Each of the plurality of arms can support at least two rotor blades.

Each arm can have a joint connected to the stem portion and at least two branch portions connected to the joint. The one or more branch portions can move relative to the stem portion between an extended state and a compacted state. In some cases, an angle between a branch portion and the stem portion can be greater than 90 degrees when the branch portion is in the extended state. An angle between a branch portion and the stem portion can be less than or equal to 90 degrees when the branch portion is in the compacted state. An angle between a branch portion and the stem portion when the branch portion is in an extended state can be greater than an angle between a branch portion and the stem portion when the branch portion is in the compacted state. A distance from the central body to a rotor supported by a branch portion in the extended state can be greater than a distance from the central body to the rotor supported by the branch portion in the compacted state. The one or more branch portions can include at least two branch portions that form a Y-shape with the stem portion when the branch portions are in the extended state. Movement of the one or more branch portions between the extended state and the compacted state may not include any vertical motion relative to the central body. Movement of the one or more branch portions between the extended state and the compacted state may include less than a 5 degree range of vertical motion relative to the central body. Movement of the one or more branch portions between the extended state and the compacted state may include vertical motion relative to the central body. Movement of the one or more branch portions between the extended state and the compacted state may include lateral motion relative to the central body.

The one or more joints may lock a position of the branch portion relative to the stem portion in the extended state. The one or more joints may use a threaded connection mechanism to lock the position of the branch portion. The one or more joints may use a positioning pin to lock the position of the branch portion. The positioning pin may pass through the branch portion and the joint.

The one or more joints may each comprise a seal that isolates an inner portion of the joint from an ambient environment in the extended state. The seal can be an air tight seal. The seal can be a water tight seal. The one or more branch portions can move relative to the stem portion between the extended state and the compacted state with aid of manual contact from a user. The one or more branch portions may move relative to the stem portion between the extended state and the compacted state in response to an electronic signal to change configuration. The electronic signal may originate from on-board the UAV. The electronic signal may originate from off-board the UAV. The one or more joints may include at least one pivot region that allows a branch portion to pivot about an axis with respect to the stem portion. The one or more joints may include a first pivot region that allows a first branch portion to pivot about an axis with respect to the stem portion and a second pivot region that allows a second branch portion to pivot about an axis with respect to the stem portion. Each arm in the plurality of arms can be formed from a composite tube. The composite tube can be a carbon fiber tube. Each rotor can comprise one or more shafts to accept one or more blade. Each rotor can comprise two or more blades. The rotor can comprise two or more shafts, each shaft configured to accept a blade. The two or more blades can be movable independently of one another. The two or more blades can be moveable relative to one another. The transformable aerial vehicle can weigh less than about 5 kg.

In an aspect of the disclosure a method of operating an unmanned aerial vehicle (UAV) can comprise providing the UAV described herein and providing energy to the plurality of rotors, thereby generating lift for the UAV.

In another aspect of the disclosure, a method of changing a configuration of an unmanned aerial vehicle (UAV) can comprise: (1) providing a UAV comprising a central body, a plurality of arms that extend out from the central body and each arm having one or more joints that segment the arm into a stem portion proximal to the central body and one or more branch portions distal to the central body, and a plurality of rotors, each rotor in the plurality attached to the one or more branch portions; and (2) moving the one or more branch portions horizontally relative to the central body without moving the stem portion relative to the central body.

The UAV can comprise a payload. The payload can be an imaging device. The payload can be a tank that holds a liquid volume. The liquid can be water. The liquid can be pesticide. The tank can have a nozzle that permits the liquid volume to be sprayed out of the tank. The payload can be carried beneath the central body of the UAV. The payload can be carried beneath the plurality of arms. The payload can be carried on a landing support of the UAV. The plurality of arms can include at least four arms. The plurality of arms can include at least two arms. Each of the plurality of arms can support at least two rotor blades.

Each arm can have a joint connected to the stem portion and at least two branch portions connected to the joint. The one or more branch portions can move relative to the stem portion between an extended state and a compacted state. In some cases, an angle between a branch portion and the stem portion can be greater than 90 degrees when the branch portion is in the extended state. An angle between a branch portion and the stem portion can be less than or equal to 90 degrees when the branch portion is in the compacted state. An angle between a branch portion and the stem portion when the branch portion is in an extended state can be greater than an angle between a branch portion and the stem portion when the branch portion is in the compacted state. A distance from the central body to a rotor supported by a branch portion in the extended state can be greater than a distance from the central body to the rotor supported by the branch portion in the compacted state. The one or more branch portions can include at least two branch portions that form a Y-shape with the stem portion when the branch portions are in the extended state. Movement of the one or more branch portions between the extended state and the compacted state may not include any vertical motion relative to the central body. Movement of the one or more branch portions between the extended state and the compacted state may include less than a 5 degree range of vertical motion relative to the central body. Movement of the one or more branch portions between the extended state and the compacted state may include vertical motion relative to the central body. Movement of the one or more branch portions between the extended state and the compacted state may include lateral motion relative to the central body.

The one or more joints may lock a position of the branch portion relative to the stem portion in the extended state. The one or more joints may use a threaded connection mechanism to lock the position of the branch portion. The one or more joints may use a positioning pin to lock the position of the branch portion. The positioning pin may pass through the branch portion and the joint.

The one or more joints may each comprise a seal that isolates an inner portion of the joint from an ambient environment in the extended state. The seal can be an air tight seal. The seal can be a water tight seal. The one or more branch portions can move relative to the stem portion between the extended state and the compacted state with aid of manual contact from a user. The one or more branch portions may move relative to the stem portion between the extended state and the compacted state in response to an electronic signal to change configuration. The electronic signal may originate from on-board the UAV. The electronic signal may originate from off-board the UAV. The one or more joints may include at least one pivot region that allows a branch portion to pivot about an axis with respect to the stem portion. The one or more joints may include a first pivot region that allows a first branch portion to pivot about an axis with respect to the stem portion and a second pivot region that allows a second branch portion to pivot about an axis with respect to the stem portion. Each arm in the plurality of arms can be formed from a composite tube. The composite tube can be a carbon fiber tube. Each rotor can comprise one or more shafts to accept one or more blade. Each rotor can comprise two or more blades. The rotor can comprise two or more shafts, each shaft configured to accept a blade. The two or more blades can be movable independently of one another. The two or more blades can be moveable relative to one another. The transformable aerial vehicle can weigh less than about 5 kg.

In another aspect of the disclosure, a kit for assembling an unmanned aerial vehicle (UAV) can comprise: (1) a plurality of arm components including one or more stem portions, one or more branch portions configured to attach to one or more rotors, one or more joints configured to connect the one or more stem portions with the one or more branch portions, and (2) instructions comprising information for a user of said UAV to assembly component(s) of (a), such that when the UAV is assembled. The assembled UAV is characterized in that it comprises: a central body; a plurality of arms that extend out from the central body, each arm having the one or more joints that segment the arm into the stem portion proximal to the central body and one or more branch portions distal to the central body, wherein the one or more joints permit the one or more branch portions to move horizontally relative to the central body without moving the stem portion relative to the central body. The kit can further comprise a plurality of rotors, each rotor in the plurality configured to be attached to the one or more branch portions.

The UAV can comprise a payload. The payload can be an imaging device. The payload can be a tank that holds a liquid volume. The liquid can be water. The liquid can be pesticide. The tank can have a nozzle that permits the liquid volume to be sprayed out of the tank. The payload can be carried beneath the central body of the UAV. The payload can be carried beneath the plurality of arms. The payload can be carried on a landing support of the UAV. The plurality of arms can include at least four arms. The plurality of arms can include at least two arms. Each of the plurality of arms can support at least two rotor blades.

Each arm can have a joint connected to the stem portion and at least two branch portions connected to the joint. The one or more branch portions can move relative to the stem portion between an extended state and a compacted state. In some cases, an angle between a branch portion and the stem portion can be greater than 90 degrees when the branch portion is in the extended state. An angle between a branch portion and the stem portion can be less than or equal to 90 degrees when the branch portion is in the compacted state. An angle between a branch portion and the stem portion when the branch portion is in an extended state can be greater than an angle between a branch portion and the stem portion when the branch portion is in the compacted state. A distance from the central body to a rotor supported by a branch portion in the extended state can be greater than a distance from the central body to the rotor supported by the branch portion in the compacted state. The one or more branch portions can include at least two branch portions that form a Y-shape with the stem portion when the branch portions are in the extended state. Movement of the one or more branch portions between the extended state and the compacted state may not include any vertical motion relative to the central body. Movement of the one or more branch portions between the extended state and the compacted state may include less than a 5 degree range of vertical motion relative to the central body. Movement of the one or more branch portions between the extended state and the compacted state may include vertical motion relative to the central body. Movement of the one or more branch portions between the extended state and the compacted state may include lateral motion relative to the central body.

The one or more joints may lock a position of the branch portion relative to the stem portion in the extended state. The one or more joints may use a threaded connection mechanism to lock the position of the branch portion. The one or more joints may use a positioning pin to lock the position of the branch portion. The positioning pin may pass through the branch portion and the joint.

The one or more joints may each comprise a seal that isolates an inner portion of the joint from an ambient environment in the extended state. The seal can be an air tight seal. The seal can be a water tight seal. The one or more branch portions can move relative to the stem portion between the extended state and the compacted state with aid of manual contact from a user. The one or more branch portions may move relative to the stem portion between the extended state and the compacted state in response to an electronic signal to change configuration. The electronic signal may originate from on-board the UAV. The electronic signal may originate from off-board the UAV. The one or more joints may include at least one pivot region that allows a branch portion to pivot about an axis with respect to the stem portion. The one or more joints may include a first pivot region that allows a first branch portion to pivot about an axis with respect to the stem portion and a second pivot region that allows a second branch portion to pivot about an axis with respect to the stem portion. Each arm in the plurality of arms can be formed from a composite tube. The composite tube can be a carbon fiber tube. Each rotor can comprise one or more shafts to accept one or more blade. Each rotor can comprise two or more blades. The rotor can comprise two or more shafts, each shaft configured to accept a blade. The two or more blades can be movable independently of one another. The two or more blades can be moveable relative to one another. The transformable aerial vehicle can weigh less than about 5 kg.

In another aspect of the disclosure, an unmanned aerial vehicle (UAV) can comprise: a central body; a plurality of arms that extend out from the central body, each arm having one or more joints that segment the arm into a stem portion proximal to the central body and one or more branch portions distal to the central body; and a plurality of rotors, each rotor in the plurality attached to the one or more branch portions, wherein the one or more joints permit a horizontal distance of each rotor relative to the central body to be variable by a greater amount than a vertical distance.

The UAV can comprise a payload. The payload can be an imaging device. The payload can be a tank that holds a liquid volume. The liquid can be water. The liquid can be pesticide. The tank can have a nozzle that permits the liquid volume to be sprayed out of the tank. The payload can be carried beneath the central body of the UAV. The payload can be carried beneath the plurality of arms. The payload can be carried on a landing support of the UAV. The plurality of arms can include at least four arms. The plurality of arms can include at least two arms. Each of the plurality of arms can support at least two rotor blades.

Each arm can have a joint connected to the stem portion and at least two branch portions connected to the joint. The distance can be varied between an extended state and a compacted state, wherein the distance is greater in the extended state. The one or more branch portions can include at least two branch portions that form a Y-shape with the stem portion when the branch portions are in the extended state. Movement of the one or more branch portions between the extended state and the compacted state may not include any vertical motion relative to the central body. Movement of the one or more branch portions between the extended state and the compacted state may include less than a 5 degree range of vertical motion relative to the central body. Movement of the one or more branch portions between the extended state and the compacted state may include vertical motion relative to the central body. Movement of the one or more branch portions between the extended state and the compacted state may include lateral motion relative to the central body.

The one or more joints may lock a position of the branch portion relative to the stem portion in the extended state. The one or more joints may use a threaded connection mechanism to lock the position of the branch portion. The one or more joints may use a positioning pin to lock the position of the branch portion. The positioning pin may pass through the branch portion and the joint.

The one or more joints may each comprise a seal that isolates an inner portion of the joint from an ambient environment in the extended state. The seal can be an air tight seal. The seal can be a water tight seal. The one or more branch portions can move relative to the stem portion between the extended state and the compacted state with aid of manual contact from a user. The one or more branch portions may move relative to the stem portion between the extended state and the compacted state in response to an electronic signal to change configuration. The electronic signal may originate from on-board the UAV. The electronic signal may originate from off-board the UAV. The one or more joints may include at least one pivot region that allows a branch portion to pivot about an axis with respect to the stem portion. The one or more joints may include a first pivot region that allows a first branch portion to pivot about an axis with respect to the stem portion and a second pivot region that allows a second branch portion to pivot about an axis with respect to the stem portion. Each arm in the plurality of arms can be formed from a composite tube. The composite tube can be a carbon fiber tube. Each rotor can comprise one or more shafts to accept one or more blade. Each rotor can comprise two or more blades. The rotor can comprise two or more shafts, each shaft configured to accept a blade. The two or more blades can be movable independently of one another. The two or more blades can be moveable relative to one another. The transformable aerial vehicle can weigh less than about 5 kg.

In another aspect of the disclosure, a method of operating an unmanned aerial vehicle (UAV) can comprise providing the UAV described herein and providing energy to the plurality of rotors, thereby generating lift for the UAV.

In another aspect of the disclosure, a method of changing a configuration of an unmanned aerial vehicle (UAV) can comprise: (1) providing a UAV comprising a central body, a plurality of arms that extend out from the central body and each arm having one or more joints that segment the arm into a stem portion proximal to the central body and one or more branch portions distal to the central body, and a plurality of rotors and each rotor in the plurality attached to the one or more branch portions; and (2) varying a horizontal distance of each rotor relative to the central body with aid of the one or more joints by a greater amount than a vertical distance.

The UAV can comprise a payload. The payload can be an imaging device. The payload can be a tank that holds a liquid volume. The liquid can be water. The liquid can be pesticide. The tank can have a nozzle that permits the liquid volume to be sprayed out of the tank. The payload can be carried beneath the central body of the UAV. The payload can be carried beneath the plurality of arms. The payload can be carried on a landing support of the UAV. The plurality of arms can include at least four arms. The plurality of arms can include at least two arms. Each of the plurality of arms can support at least two rotor blades.

Each arm can have a joint connected to the stem portion and at least two branch portions connected to the joint. The distance can be varied between an extended state and a compacted state, wherein the distance is greater in the extended state. The one or more branch portions can include at least two branch portions that form a Y-shape with the stem portion when the branch portions are in the extended state. Movement of the one or more branch portions between the extended state and the compacted state may not include any vertical motion relative to the central body. Movement of the one or more branch portions between the extended state and the compacted state may include less than a 5 degree range of vertical motion relative to the central body. Movement of the one or more branch portions between the extended state and the compacted state may include vertical motion relative to the central body. Movement of the one or more branch portions between the extended state and the compacted state may include lateral motion relative to the central body.

The one or more joints may lock a position of the branch portion relative to the stem portion in the extended state. The one or more joints may use a threaded connection mechanism to lock the position of the branch portion. The one or more joints may use a positioning pin to lock the position of the branch portion. The positioning pin may pass through the branch portion and the joint.

The one or more joints may each comprise a seal that isolates an inner portion of the joint from an ambient environment in the extended state. The seal can be an air tight seal. The seal can be a water tight seal. The one or more branch portions can move relative to the stem portion between the extended state and the compacted state with aid of manual contact from a user. The one or more branch portions may move relative to the stem portion between the extended state and the compacted state in response to an electronic signal to change configuration. The electronic signal may originate from on-board the UAV. The electronic signal may originate from off-board the UAV. The one or more joints may include at least one pivot region that allows a branch portion to pivot about an axis with respect to the stem portion. The one or more joints may include a first pivot region that allows a first branch portion to pivot about an axis with respect to the stem portion and a second pivot region that allows a second branch portion to pivot about an axis with respect to the stem portion. Each arm in the plurality of arms can be formed from a composite tube. The composite tube can be a carbon fiber tube. Each rotor can comprise one or more shafts to accept one or more blade. Each rotor can comprise two or more blades. The rotor can comprise two or more shafts, each shaft configured to accept a blade. The two or more blades can be movable independently of one another. The two or more blades can be moveable relative to one another. The transformable aerial vehicle can weigh less than about 5 kg.

In another aspect of the disclosure, a kit for assembling an unmanned aerial vehicle (UAV) may comprise a plurality of arm components including: one or more stem portions, one or more branch portions configured to attach to one or more rotors, one or more joints configured to connect the one or more stem portions with the one or more branch portions, and instructions comprising information for a user of said UAV to assembly component(s) of (a), such that when the UAV is assembled, the assembled UAV is characterized in that it comprises: a central body; a plurality of arms that extend out from the central body, each arm having the one or more joints that segment the arm into the stem portion proximal to the central body and one or more branch portions distal to the central body. The kit can further comprise a plurality of rotors, each rotor in the plurality configured to be attached to the one or more branch portions.

The UAV can comprise a payload. The payload can be an imaging device. The payload can be a tank that holds a liquid volume. The liquid can be water. The liquid can be pesticide. The tank can have a nozzle that permits the liquid volume to be sprayed out of the tank. The payload can be carried beneath the central body of the UAV. The payload can be carried beneath the plurality of arms. The payload can be carried on a landing support of the UAV. The plurality of arms can include at least four arms. The plurality of arms can include at least two arms. Each of the plurality of arms can support at least two rotor blades.

Each arm can have a joint connected to the stem portion and at least two branch portions connected to the joint. The distance can be varied between an extended state and a compacted state, wherein the distance is greater in the extended state. The one or more branch portions can include at least two branch portions that form a Y-shape with the stem portion when the branch portions are in the extended state. Movement of the one or more branch portions between the extended state and the compacted state may not include any vertical motion relative to the central body. Movement of the one or more branch portions between the extended state and the compacted state may include less than a 5 degree range of vertical motion relative to the central body. Movement of the one or more branch portions between the extended state and the compacted state may include vertical motion relative to the central body. Movement of the one or more branch portions between the extended state and the compacted state may include lateral motion relative to the central body.

The one or more joints may lock a position of the branch portion relative to the stem portion in the extended state. The one or more joints may use a threaded connection mechanism to lock the position of the branch portion. The one or more joints may use a positioning pin to lock the position of the branch portion. The positioning pin may pass through the branch portion and the joint.

The one or more joints may each comprise a seal that isolates an inner portion of the joint from an ambient environment in the extended state. The seal can be an air tight seal. The seal can be a water tight seal. The one or more branch portions can move relative to the stem portion between the extended state and the compacted state with aid of manual contact from a user. The one or more branch portions may move relative to the stem portion between the extended state and the compacted state in response to an electronic signal to change configuration. The electronic signal may originate from on-board the UAV. The electronic signal may originate from off-board the UAV. The one or more joints may include at least one pivot region that allows a branch portion to pivot about an axis with respect to the stem portion. The one or more joints may include a first pivot region that allows a first branch portion to pivot about an axis with respect to the stem portion and a second pivot region that allows a second branch portion to pivot about an axis with respect to the stem portion. Each arm in the plurality of arms can be formed from a composite tube. The composite tube can be a carbon fiber tube. Each rotor can comprise one or more shafts to accept one or more blade. Each rotor can comprise two or more blades. The rotor can comprise two or more shafts, each shaft configured to accept a blade. The two or more blades can be movable independently of one another. The two or more blades can be moveable relative to one another. The transformable aerial vehicle can weigh less than about 5 kg.

In another aspect of the disclosure, an arm configured to support a propulsion unit of an unmanned aerial vehicle (UAV) can comprise: a stem portion configured to be proximal to a central body of the UAV when the arm is connected to the UAV; one or more branch portions configured to be distal to the central body when the arm is connected to the UAV; a joint configured to connect the stem portion with the one or more branch portions, wherein at least one of the stem portion, or the one or more branch portions, are inserted within a corresponding protrusion of the joint, and wherein a sleeve is disposed over (1) at least a portion of the at least one of the stem portion, or the one or more branch portions and (2) at least a portion of the corresponding protrusion.

The sleeve can comprise a first mating feature, configured to mate with a second mating feature of the corresponding protrusion. The first mating feature or the second mating feature can comprise a threaded interface. The first mating feature can comprise a guide and the second mating features can comprise a protrusion, or wherein the first mating feature comprises a protrusion and the second mating feature comprises a guide. The arm can further comprise an arm connecting component configured to connect with (1) the at least one of the stem portion, or the one or more branch portions, and (2) the sleeve. The arm connecting component can comprise a threaded interface. The arm can further comprise a sealing ring between the arm connecting component and the at least one of the stem portion, or the one or more branch portions. The sleeve can isolate an inner portion of the joint from an ambient environment. The sleeve can form an air tight seal. The sleeve can form a water tight seal. A diameter of the stem portion and a diameter of a branch portion can be the same. A diameter of the stem portion can be greater than a diameter of a branch portion. The joint can be separable from the stem portion and the one or more branch portions. The joint can be integrally formed with at least one of the stem portion.

The arm can further comprise a propulsion unit attached to the one or more branch portions. The propulsion unit can be a rotor. The rotor can comprise two or more blades. The rotor can comprise two or more shafts, each shaft configured to accept a blade. The two or more blades can be movable independently of one another. The two or more blades can be movable relative to one another.

In another aspect of the disclosure, an unmanned aerial vehicle can comprise a central body and a plurality of arms as described herein extending from the central body.

In another aspect of the disclosure, an arm configured to support a propulsion unit of an unmanned aerial vehicle (UAV) can comprise: a stem portion of the arm; one or more branch portions of the arm; a joint configured to connect the stem portion with the one or more branch portions, wherein at least one of the stem portion, or the one or more branch portions, is connected to a corresponding region of the joint via a threaded connection.

The corresponding region of the joint can be a corresponding protrusion of the joint configured to accept at least a portion of at least one of the stem portion, or the one or more branch portions. The arm can further comprise a sleeve disposed over (1) at least a portion of the at least one of the stem portion, or the one or more branch portions and (2) at least a portion of the corresponding protrusion. The sleeve can comprise a first mating feature, configured to mate with a second mating feature of the corresponding protrusion. A threaded interface can be provided on the stem portion and the one or more branch portions. A threaded interface can be provided on the stem portion and is not provided on the one or more branch portions. The threaded connection can be formed via a threaded interface on an exterior surface of the corresponding region and an interior surface of the at least one of the stem portion, or the one or more branch portions. The threaded connection can be formed via a threaded interface on an interior surface of the corresponding region and an exterior surface of the at least one of the stem portion, or the one or more branch portions. The threaded connection can be formed via a threaded interface on an exterior surface of the corresponding region and an interior surface of the at least one of the stem portion, or the one or more branch portions. The connector can be a sleeve disposed over (1) at least a portion of the at least one of the stem portion, or the one or more branch portions and (2) at least a portion of the corresponding region.

The diameter of the stem portion and a diameter of a branch portion can be the same. A diameter of the stem portion can be greater than a diameter of a branch portion. The joint can be separable from the stem portion and the one or more branch portions. The joint can be integrally formed with at least one of the stem portion. The arm can further comprise a propulsion unit attached to the one or more branch portions. The propulsion unit can be a rotor. The rotor can comprise two or more blades. The rotor can comprise two or more shafts, each shaft configured to accept a blade. The two or more blades can be movable independently of one another. The two or more blades can be movable relative to one another.

In another aspect of the disclosure, an unmanned aerial vehicle can comprise a central body and a plurality of arms as described herein extending from the central body.

In another aspect of the disclosure, an arm configured to support a propulsion unit of an unmanned aerial vehicle (UAV) can comprise: a stem portion with a stem interior space; one or more branch portions with a branch interior space; and one or more joints configured to connect the stem portion with the one or more branch portions, wherein the one or more joints provide fluidic communication between the stem interior space and the branch interior space.

The arm can comprise the propulsion unit attached to the one or more branch portions. The arm can be configured to permit fluid to flow within the stem interior space to the branch interior space through the one or more joints. The arm can be configured to permit the fluid to flow through the branch interior space to the propulsion unit to permit cooling of the propulsion unit. The propulsion unit can include a support that aids in the connection of the propulsion unit to the one or more branch portions. The propulsion unit can include a motor configured to drive one or more rotor blades. The fluid can flow to the motor to permit cooling of the motor. The fluid can be a gas. The fluid can be a liquid. The arm can be configured to permit fluid to flow within the branch interior space to the stem interior space through the one or more joints. The arm can be configured to permit the fluid to flow through the branch interior space from the propulsion unit. The one or more joints can provide fluidic communication between the stem interior space and the branch interior space when the stem portion and the one or more branch portions are in the compacted state. The one or more joints may not provide fluidic communication between the stem interior space and the branch interior space when the stem portion and the one or more branch portions are in the compacted state.

The stem portion can be hollow and a hollow portion can form the stem interior space. The one or more or more branch portions can be hollow and a hollow portion can form the branch interior space. The stem portion can be formed of a porous material and one or more pores can for the stem interior space. The one or more branch portions can be formed of a porous material and one or more pores can for the branch interior space. The one or more joints can comprise one or more fluid passageways provide the fluidic communication between the stem interior space and the branch interior space. The one or more joints can be hollow.

In another aspect of the disclosure, an unmanned aerial vehicle (UAV), can comprise a central body; and the arm described herein extending from the central body. The UAV central body can include an interior space. The interior space can be configured to convey fluid to the stem interior space. The UAV can further comprise a fan that aids in conveying the fluid to the stem interior space. The UAV can further comprise a fan that aids in conveying the fluid to the one or more branch portions. The central body can include a vent that permits fluid to follow into the interior space of the central body.

In another aspect of the disclosure, an arm configured to support a propulsion unit of an unmanned aerial vehicle (UAV) can comprise: a stem portion with a stem interior space; a plurality of branch portions, each with a branch interior space; and one or more joints configured to connect the stem portion with the plurality of branch portions, wherein the one or more joints provide fluidic communication between the stem interior space and the branch interior space, wherein the stem interior space and the branch interior space are isolated from an ambient environment.

The arm can comprise the propulsion unit attached to the one or more branch portions. The arm can be configured to permit fluid to flow within the stem interior space to the branch interior space through the one or more joints. The arm can be configured to permit the fluid to flow through the branch interior space to the propulsion unit to permit cooling of the propulsion unit. The propulsion unit can include a support that aids in the connection of the propulsion unit to the one or more branch portions. The propulsion unit can include a motor configured to drive one or more rotor blades. The fluid can flow to the motor to permit cooling of the motor. The fluid can be a gas. The fluid can be a liquid. The arm can be configured to permit fluid to flow within the branch interior space to the stem interior space through the one or more joints. The arm can be configured to permit the fluid to flow through the branch interior space from the propulsion unit. The one or more joints can provide fluidic communication between the stem interior space and the branch interior space when the stem portion and the one or more branch portions are in the compacted state. The one or more joints may not provide fluidic communication between the stem interior space and the branch interior space when the stem portion and the one or more branch portions are in the compacted state.

The stem portion can be hollow and a hollow portion can form the stem interior space. The one or more or more branch portions can be hollow and a hollow portion can form the branch interior space. The stem portion can be formed of a porous material and one or more pores can for the stem interior space. The one or more branch portions can be formed of a porous material and one or more pores can for the branch interior space. The one or more joints can comprise one or more fluid passageways provide the fluidic communication between the stem interior space and the branch interior space. The one or more joints can be hollow.

In another aspect of the disclosure, an unmanned aerial vehicle (UAV), can comprise a central body; and the arm described herein extending from the central body. The UAV central body can include an interior space. The interior space can be configured to convey fluid to the stem interior space. The UAV can further comprise a fan that aids in conveying the fluid to the stem interior space. The UAV can further comprise a fan that aids in conveying the fluid to the one or more branch portions. The central body can include a vent that permits fluid to follow into the interior space of the central body.

In another aspect of the disclosure, an unmanned aerial vehicle (UAV) can comprise: one or more arms, each arm comprising an arm interior space; and one or more propulsion units supported on the one or more arms, wherein the arm interior space provides fluidic communication between the one or more arms and the one or more propulsion units such that a forced flow is driven (1) from the propulsion unit to the arm, (2) from the arm to the propulsion unit, or (3) some combination thereof.

The arm can be configured to permit fluid to flow through the arm interior space from the central body to the one or more propulsion units to permit cooling of the propulsion unit. The propulsion unit can include a support that aids in the connection of the propulsion unit to the arm. The propulsion unit can include a motor configured to drive one or more rotor blades. The fluid can permit cooling of the motor. The fluid can be a gas. The fluid can be a liquid. The arm can be configured to permit fluid to flow through the arm interior space to the one or more propulsion units. The arm can be configured to permit the fluid to flow through the arm interior space from the propulsion unit.

The arm can be hollow and a hollow portion can form the arm interior space. The arm can be formed of a porous material and one or more pores can for the arm space.

The UAV can further comprise a central body, wherein the central body includes a vent that permits fluid to follow into the interior space of the central body. The UAV can further comprise a fan that aids in conveying the fluid to the stem interior space. The UAV can further comprise a fan that aids in conveying the fluid to the one or more branch portions. The arm can include a stem portion proximal to the central body, and one or more branch portions configured to be distal to the central body. The arm can further comprise one or more joints configured to connect the stem portion with the one or more branch portions. The one or more joints can permit the one or more branch portions to move relative to the stem portion. The one or more joints can comprise one or more fluid passageways.

In another aspect of the disclosure, a kit for assembling an unmanned aerial vehicle (UAV) can comprise a plurality of arm components including: one or more stem portions, one or more branch portions, one or more joint configured to connect each of the one or more stem portions with the one or more branch portions, wherein at least one of the stem portion, or the one or more branch portions, are inserted within a corresponding protrusion of the joint, and a sleeve configured to be disposed over (1) at least a portion of the stem portion, or the one or more branch portions and (2) at least a portion of the corresponding protrusion; and instructions comprising information for a user of said UAV to assemble component(s) of (a), such that when the UAV is assembled, the assembled UAV is characterized in that it comprises: a central body; and a plurality of arms that extend out from the central body.

The sleeve can comprise a first mating feature, configured to mate with a second mating feature of the corresponding protrusion. The first mating feature or the second mating feature can comprise a threaded interface. The first mating feature can comprise a guide and the second mating features can comprise a protrusion, or wherein the first mating feature comprises a protrusion and the second mating feature comprises a guide. The arm can further comprise an arm connecting component configured to connect with (1) the at least one of the stem portion, or the one or more branch portions, and (2) the sleeve. The arm connecting component can comprise a threaded interface. The arm can further comprise a sealing ring between the arm connecting component and the at least one of the stem portion, or the one or more branch portions. The sleeve can isolate an inner portion of the joint from an ambient environment. The sleeve can form an air tight seal. The sleeve can form a water tight seal. A diameter of the stem portion and a diameter of a branch portion can be the same. A diameter of the stem portion can be greater than a diameter of a branch portion. The joint can be separable from the stem portion and the one or more branch portions. The joint can be integrally formed with at least one of the stem portion.

The arm can further comprise a propulsion unit attached to the one or more branch portions. The propulsion unit can be a rotor. The rotor can comprise two or more blades. The rotor can comprise two or more shafts, each shaft configured to accept a blade. The two or more blades can be movable independently of one another. The two or more blades can be movable relative to one another.

In another aspect of the disclosure, an unmanned aerial vehicle can comprise a central body and a plurality of arms as described herein extending from the central body.

In another aspect of the disclosure, a kit for assembling an unmanned aerial vehicle (UAV), can comprise a plurality of arm components including: one or more stem portions, one or more branch portions, and one or more joint configured to connect each of the one or more stem portions with the one or more branch portions, wherein at least one of the stem portions, or the one or more branch portions, are connected to a corresponding region of the joint via a threaded connection; and instructions comprising information for a user of said UAV to assemble component(s) of (a), such that when the UAV is assembled, the assembled UAV is characterized in that it comprises: a central body; and a plurality of arms that extend out from the central body.

The corresponding region of the joint can be a corresponding protrusion of the joint configured to accept at least a portion of at least one of the stem portion, or the one or more branch portions. The arm can further comprise a sleeve disposed over (1) at least a portion of the at least one of the stem portion, or the one or more branch portions and (2) at least a portion of the corresponding protrusion. The sleeve can comprise a first mating feature, configured to mate with a second mating feature of the corresponding protrusion. A threaded interface can be provided on the stem portion and the one or more branch portions. A threaded interface can be provided on the stem portion and is not provided on the one or more branch portions. The threaded connection can be formed via a threaded interface on an exterior surface of the corresponding region and an interior surface of the at least one of the stem portion, or the one or more branch portions. The threaded connection can be formed via a threaded interface on an interior surface of the corresponding region and an exterior surface of the at least one of the stem portion, or the one or more branch portions. The threaded connection can be formed via a threaded interface on an exterior surface of the corresponding region and an interior surface of the at least one of the stem portion, or the one or more branch portions. The connector can be a sleeve disposed over (1) at least a portion of the at least one of the stem portion, or the one or more branch portions and (2) at least a portion of the corresponding region.

The diameter of the stem portion and a diameter of a branch portion can be the same. A diameter of the stem portion can be greater than a diameter of a branch portion. The joint can be separable from the stem portion and the one or more branch portions. The joint can be integrally formed with at least one of the stem portion. The arm can further comprise a propulsion unit attached to the one or more branch portions. The propulsion unit can be a rotor. The rotor can comprise two or more blades. The rotor can comprise two or more shafts, each shaft configured to accept a blade. The two or more blades can be movable independently of one another. The two or more blades can be movable relative to one another.

In another aspect of the disclosure, a kit for assembling an unmanned aerial vehicle (UAV) can comprise a plurality of arm components including: one or more stem portions with an interior space, one or more branch portions with an interior space, and one or more joint configured to connect each of the one or more stem portions with the one or more branch portions, wherein the one or more joints provide fluidic communication between the stem interior space and the branch interior space; and instructions comprising information for a user of said UAV to assemble component(s) of (a), such that when the UAV is assembled, the assembled UAV is characterized in that it comprises: a central body; and a plurality of arms that extend out from the central body.

The kit can further comprise a propulsion unit. The kit can comprise the propulsion unit attached to the one or more branch portions. The arm can be configured to permit fluid to flow within the stem interior space to the branch interior space through the one or more joints. The arm can be configured to permit the fluid to flow through the branch interior space to the propulsion unit to permit cooling of the propulsion unit. The propulsion unit can include a support that aids in the connection of the propulsion unit to the one or more branch portions. The propulsion unit can include a motor configured to drive one or more rotor blades. The fluid can flow to the motor to permit cooling of the motor. The fluid can be a gas. The fluid can be a liquid. The arm can be configured to permit fluid to flow within the branch interior space to the stem interior space through the one or more joints. The arm can be configured to permit the fluid to flow through the branch interior space from the propulsion unit. The one or more joints can provide fluidic communication between the stem interior space and the branch interior space when the stem portion and the one or more branch portions are in the compacted state. The one or more joints may not provide fluidic communication between the stem interior space and the branch interior space when the stem portion and the one or more branch portions are in the compacted state.

The stem portion can be hollow and a hollow portion can form the stem interior space. The one or more or more branch portions can be hollow and a hollow portion can form the branch interior space. The stem portion can be formed of a porous material and one or more pores can for the stem interior space. The one or more branch portions can be formed of a porous material and one or more pores can for the branch interior space. The one or more joints can comprise one or more fluid passageways provide the fluidic communication between the stem interior space and the branch interior space. The one or more joints can be hollow.

In another aspect of the disclosure, a kit for assembling an unmanned aerial vehicle (UAV) can comprise a plurality of arm components including: one or more stem portions with an interior space, one or more branch portions with an interior space, and one or more joint configured to connect each of the one or more stem portions with the one or more branch portions, wherein the one or more joints provide fluidic communication between the stem interior space and the branch interior space, wherein the stem interior space and the branch interior space are isolated from an ambient environment; and instructions comprising information for a user of said UAV to assemble component(s) of (a), such that when the UAV is assembled, the assembled UAV is characterized in that it comprises: a central body; and a plurality of arms that extend out from the central body.

The kit can further comprise a propulsion unit. The kit can comprise the propulsion unit attached to the one or more branch portions. The arm can be configured to permit fluid to flow within the stem interior space to the branch interior space through the one or more joints. The arm can be configured to permit the fluid to flow through the branch interior space to the propulsion unit to permit cooling of the propulsion unit. The propulsion unit can include a support that aids in the connection of the propulsion unit to the one or more branch portions. The propulsion unit can include a motor configured to drive one or more rotor blades. The fluid can flow to the motor to permit cooling of the motor. The fluid can be a gas. The fluid can be a liquid. The arm can be configured to permit fluid to flow within the branch interior space to the stem interior space through the one or more joints. The arm can be configured to permit the fluid to flow through the branch interior space from the propulsion unit. The one or more joints can provide fluidic communication between the stem interior space and the branch interior space when the stem portion and the one or more branch portions are in the compacted state. The one or more joints may not provide fluidic communication between the stem interior space and the branch interior space when the stem portion and the one or more branch portions are in the compacted state.

The stem portion can be hollow and a hollow portion can form the stem interior space. The one or more or more branch portions can be hollow and a hollow portion can form the branch interior space. The stem portion can be formed of a porous material and one or more pores can for the stem interior space. The one or more branch portions can be formed of a porous material and one or more pores can for the branch interior space. The one or more joints can comprise one or more fluid passageways provide the fluidic communication between the stem interior space and the branch interior space. The one or more joints can be hollow.

In another aspect of the disclosure, a kit for assembling an unmanned aerial vehicle can comprise a plurality of arm components including: one or more arms with an interior space, one or more propulsion units configured to be supported on the one or more arms, wherein the arm interior space provides fluidic communication between the one or more arms and the one or more propulsion units such that fluid is forced to flow (1) from the propulsion unit to the arm, (2) from the arm to the propulsion unit, or (3) some combination thereof, when the UAV is assembled; and instructions comprising information for a user of said UAV to assemble component(s) of (a), such that when the UAV is assembled, the assembled UAV is characterized in that it comprises: a central body; and a plurality of arms that extend out from the central body.

The kit can further comprise a propulsion unit. The kit can comprise the propulsion unit attached to the one or more branch portions. The arm can be configured to permit fluid to flow within the stem interior space to the branch interior space through the one or more joints. The arm can be configured to permit the fluid to flow through the branch interior space to the propulsion unit to permit cooling of the propulsion unit. The propulsion unit can include a support that aids in the connection of the propulsion unit to the one or more branch portions. The propulsion unit can include a motor configured to drive one or more rotor blades. The fluid can flow to the motor to permit cooling of the motor. The fluid can be a gas. The fluid can be a liquid. The arm can be configured to permit fluid to flow within the branch interior space to the stem interior space through the one or more joints. The arm can be configured to permit the fluid to flow through the branch interior space from the propulsion unit. The one or more joints can provide fluidic communication between the stem interior space and the branch interior space when the stem portion and the one or more branch portions are in the compacted state. The one or more joints may not provide fluidic communication between the stem interior space and the branch interior space when the stem portion and the one or more branch portions are in the compacted state.

The stem portion can be hollow and a hollow portion can form the stem interior space. The one or more or more branch portions can be hollow and a hollow portion can form the branch interior space. The stem portion can be formed of a porous material and one or more pores can for the stem interior space. The one or more branch portions can be formed of a porous material and one or more pores can for the branch interior space. The one or more joints can comprise one or more fluid passageways provide the fluidic communication between the stem interior space and the branch interior space. The one or more joints can be hollow.

In another aspect of the disclosure, a kit for assembling an unmanned aerial vehicle (UAV) can comprise a plurality of arm components including: one or more arms with an interior space, one or more propulsion units configured to be supported on the one or more arms, wherein the arm interior space provides fluidic communication between the one or more arms and the one or more propulsion units such that fluid is forced to flow (1) from the propulsion unit to the arm, (2) from the arm to the propulsion unit, or (3) some combination thereof, when the UAV is assembled; and instructions comprising information for a user of said UAV to assemble component(s) of (a), such that when the UAV is assembled, the assembled UAV is characterized in that it comprises: a central body; and a plurality of arms that extend out from the central body.

The arm can be configured to permit fluid to flow through the arm interior space from the central body to the one or more propulsion units to permit cooling of the propulsion unit. The propulsion unit can include a support that aids in the connection of the propulsion unit to the arm. The propulsion unit can include a motor configured to drive one or more rotor blades. The fluid can permit cooling of the motor. The fluid can be a gas. The fluid can be a liquid. The arm can be configured to permit fluid to flow through the arm interior space to the one or more propulsion units. The arm can be configured to permit the fluid to flow through the arm interior space from the propulsion unit.

The arm can be hollow and a hollow portion can form the arm interior space. The arm can be formed of a porous material and one or more pores can for the arm space.

The UAV can further comprise a central body, wherein the central body includes a vent that permits fluid to follow into the interior space of the central body. The UAV can further comprise a fan that aids in conveying the fluid to the stem interior space. The UAV can further comprise a fan that aids in conveying the fluid to the one or more branch portions. The arm can include a stem portion proximal to the central body, and one or more branch portions configured to be distal to the central body. The arm can further comprise one or more joints configured to connect the stem portion with the one or more branch portions. The one or more joints can permit the one or more branch portions to move relative to the stem portion. The one or more joints can comprise one or more fluid passageways.

In another aspect of the disclosure, an unmanned aerial vehicle (UAV) can comprise a central body comprising a central body interior space one or more arms extending from the central body, each arm comprising an arm interior space, wherein the one or more arms are moveable relative to the central body; and one or more components in the arm interior space, wherein the arm interior space provides fluidic communication between the central body of the UAV and the one or more arms such that a forced flow is driven (1) from the central body to at least a portion of the arm, (2) from the arm to the central body of the UAV, or (3) some combination thereof.

The arm can be configured to permit fluid to flow through the arm interior space from the central body to the one or more propulsion units to permit cooling of the propulsion unit. The fluid can be gas. The fluid can be liquid. The arm can be hollow, and a hollow portion forms the arm interior space. The arm can be formed of a porous material, and one or more pores form the arm interior space. The UAV can further comprise a fan that drives the forced flow of fluid to the arm interior space. The arm can include a stem portion proximal to the central body, and one or more branch portions configured to be distal to the central body. The arm can further comprise one or more joints configured to connect the stem portion with the one or more branch portions. The one or more joints can permit the one or more branch portions to move relative to the stem portion. The one or more joints can comprise one or more fluid passageways.

In another aspect of the disclosure, a method of operating an unmanned aerial vehicle (UAV) comprises: providing the UAV, wherein the UAV comprises a plurality of rotors, each rotor in the plurality attached to the one or more arms; providing energy to the plurality of rotors, thereby generating lift for the UAV.

In another aspect of the disclosure, a method of changing a configuration of an unmanned aerial vehicle (UAV) comprises: (a) providing a UAV comprising: a central body comprising a central body interior space; one or more arms extending from the central body, each arm comprising an arm interior space, wherein the one or more arms are moveable relative to the central body; and one or more components in the arm interior space, wherein the arm interior space provides fluidic communication between the central body of the UAV and the one or more arms such that a forced flow is driven (1) from the central body to at least a portion of the arm, (2) from the arm to the central body of the UAV, or (3) some combination thereof; and (b) moving the one or more arms relative to the central body.

The arm can be configured to permit fluid to flow through the arm interior space from the central body to the one or more propulsion units to permit cooling of the propulsion unit. The fluid can be gas. The fluid can be liquid. The arm can be hollow, and a hollow portion forms the arm interior space. The arm can be formed of a porous material, and one or more pores form the arm interior space. The UAV can further comprise a fan that drives the forced flow of fluid to the arm interior space. The arm can include a stem portion proximal to the central body, and one or more branch portions configured to be distal to the central body. The arm can further comprise one or more joints configured to connect the stem portion with the one or more branch portions. The one or more joints can permit the one or more branch portions to move relative to the stem portion. The one or more joints can comprise one or more fluid passageways.

In another aspect of the disclosure, a kit for assembling an unmanned aerial vehicle (UAV) comprises: a central body comprising a central body interior space; one or more arms adapted to extend from the central body and moveable relative to the central body, each arm comprising an arm interior space; and one or more components configured to receive in the arm interior space, wherein the arm interior space provides fluidic communication between the central body of the UAV and the one or more arms when the kit is assembled, such that a forced flow is driven (1) from the central body to at least a portion of the arm, (2) from the arm to the central body of the UAV, or (3) some combination thereof.

The arm can be configured to permit fluid to flow through the arm interior space from the central body to the one or more propulsion units to permit cooling of the propulsion unit. The fluid can be gas. The fluid can be liquid. The arm can be hollow, and a hollow portion forms the arm interior space. The arm can be formed of a porous material, and one or more pores form the arm interior space. The UAV can further comprise a fan that drives the forced flow of fluid to the arm interior space. The arm can include a stem portion proximal to the central body, and one or more branch portions configured to be distal to the central body. The arm can further comprise one or more joints configured to connect the stem portion with the one or more branch portions. The one or more joints can permit the one or more branch portions to move relative to the stem portion. The one or more joints can comprise one or more fluid passageways.

Other objects and features of the present disclosure will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION OF THE DISCLOSURE

Figure 1:
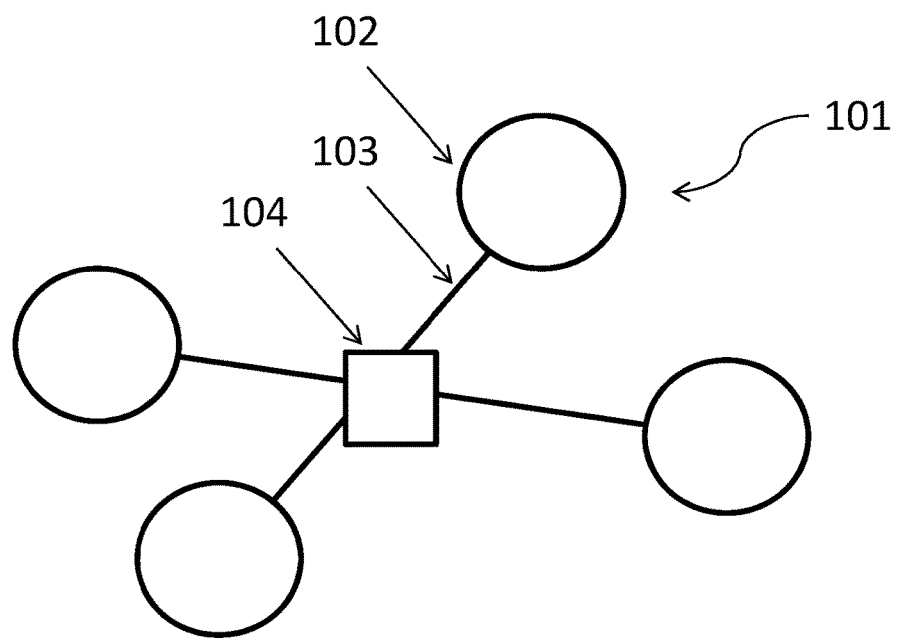
FIG. 1 shows a UAV configured for use in an agricultural environment.

The systems, devices, and methods of the present disclosure provide an unmanned aerial vehicle (UAV) that can be transformed between an extended configuration and a compacted configuration. The extended configuration may be used during flight of the UAV. The compacted configuration can reduce the size of the UAV so that the UAV can be transported. The compacted configuration can permit the UAV to be transported in a passenger vehicle. The compacted configuration can permit the UAV to be carried by a human user. One or more arms of the UAV can support one or more propulsion systems of the UAV. The one or more arms can be folded in the compacted configuration. Description of the UAV may be applied to any other type of unmanned vehicle, or any other type of movable object.

A UAV may be provided to patrol an environment to collect information about the environment or one or more subjects in the environment. The UAV can provide enjoyment for recreational use by one or more users. The UAV can be employed in an agricultural environment to deliver one or more agricultural products to land in which crops are growing. Agricultural products can include water, pesticides, fertilizer, seeds, engineered dirt, compost, or any other product configured to produce or aid in production of one or more plant species.

The agricultural product can be stored in a container attached to the UAV. The container may be a tank, bag, or any other type of reservoir. Any description herein of a tank may apply to any other type of container which may have a rigid, semi-rigid, or flexible structure. The UAV can bear the weight of the tank, while the UAV is in flight and/or while the UAV is resting on a surface (e.g., in a landed state). The tank may be attached to any component of the UAV. For instance, the tank can be attached to a body of the UAV. The tank can be attached to one or more arms of the UAV. The tank can be attached to one or more landing stands/skiff of the UAV, wherein the landing stands are configured to bear weight of the UAV when the UAV is not in flight (e.g., resting on a surface).

The tank can hold a volume of fluid, such as a liquid or a gas. The tank can hold a volume of solids, such as particulates, powders, or other solid substances. The container can be a payload of the UAV. The agricultural product can be sprayed from the tank while the UAV is in flight. The tank can comprise an outlet that causes the product to exit from the tank. For instance, the tank can comprise a nozzle that permits a fluid volume (e.g., liquid volume) to be sprayed from the tank. The UAV can traverse an environment and spray the agricultural product simultaneously. The UAV can be used in a large area. A user can transport the UAV within the large area and/or from a first area to a second area. The UAV configuration described herein can be transformed between an extended state and a compacted state such that the UAV can be transported easily in the compacted state and extended for use in the area.

FIG. 1 shows an example of an unmanned aerial vehicle (UAV) 101. The UAV 101 may have a body 104 with one or more arms 103 extending from the body. One or more propulsion units 102 may permit flight of the UAV. The one or more propulsion units 102 may be supported by the arms 103 or the body 104 of the UAV 101.

The UAV 101 can have one or more sensors. The UAV 101 may comprise one or more vision sensors such as an image sensor. For example, an image sensor may be a monocular camera, stereo vision camera, radar, sonar, or an infrared camera. The UAV 101 may further comprise other sensors that may be used to determine a location of the UAV, such as global positioning system (GPS) sensors, inertial sensors which may be used as part of or separately from an inertial measurement unit (IMU) (e.g., accelerometers, gyroscopes, magnetometers), lidar, ultrasonic sensors, acoustic sensors, WiFi sensors. The UAV can have sensor on board on board the UAV that collect information directly from an environment without contacting an additional component off board the UAV for additional information or processing. For example, a sensor that collects data directly in an environment can be a vision or audio sensor. Alternatively, the UAV can have sensors that are on board the UAV but contact one or more components off board the UAV to collect data about an environment. For example, a sensor that contacts a component off board the UAV to collect data about an environment may be a GPS sensor or another sensor that relies on connection to a another device, such as a satellite, tower, router, server, or other external device. Various examples of sensors may include, but are not limited to, location sensors (e.g., global positioning system (GPS) sensors, mobile device transmitters enabling location triangulation), vision sensors (e.g., imaging devices capable of detecting visible, infrared, or ultraviolet light, such as cameras), proximity or range sensors (e.g., ultrasonic sensors, lidar, time-of-flight or depth cameras), inertial sensors (e.g., accelerometers, gyroscopes, inertial measurement units (IMUs)), altitude sensors, attitude sensors (e.g., compasses) pressure sensors (e.g., barometers), audio sensors (e.g., microphones) or field sensors (e.g., magnetometers, electromagnetic sensors). Any suitable number and combination of sensors can be used, such as one, two, three, four, five, or more sensors. Optionally, the data can be received from sensors of different types (e.g., two, three, four, five, or more types). Sensors of different types may measure different types of signals or information (e.g., position, orientation, velocity, acceleration, proximity, pressure, etc.) and/or utilize different types of measurement techniques to obtain data. For instance, the sensors may include any suitable combination of active sensors (e.g., sensors that generate and measure energy from their own energy source) and passive sensors (e.g., sensors that detect available energy). As another example, some sensors may generate absolute measurement data that is provided in terms of a global coordinate system (e.g., position data provided by a GPS sensor, attitude data provided by a compass or magnetometer), while other sensors may generate relative measurement data that is provided in terms of a local coordinate system (e.g., relative angular velocity provided by a gyroscope; relative translational acceleration provided by an accelerometer; relative attitude information provided by a vision sensor; relative distance information provided by an ultrasonic sensor, lidar, or time-of-flight camera). The sensors onboard or off board the UAV may collect information such as location of the UAV, location of other objects, orientation of the UAV, or environmental information. A single sensor may be able to collect a complete set of information in an environment or a group of sensors may work together to collect a complete set of information in an environment. Sensors may be used for mapping of a location, navigation between locations, detection of obstacles, or detection of a target.

In some embodiments, the sensors may be configured to collect data about an environment of the UAV while the UAV is delivering a product, such as an agricultural product. For example, the UAV may simultaneously fly around and spray out a product while capturing image data, or other types of data about the environment. The UAV may deliver product in response to data captured by one or more sensors on-board the UAV.

Any description herein of a UAV 101 may apply to any type of movable object. The description of a UAV may apply to any type of unmanned movable object (e.g., which may traverse the air, land, water, or space). The UAV 101 may be capable of responding to commands from a remote controller. The remote controller may be not connected to the UAV 101, the remote controller may communicate with the UAV 101 wirelessly from a distance. In some instances, the UAV 101 may be capable of operating autonomously or semi-autonomously. The UAV 101 may be capable of following a set of pre-programmed instructions. In some instances, the UAV 101 may operate semi-autonomously by responding to one or more commands from a remote controller while otherwise operating autonomously. For instance, one or more commands from a remote controller may initiate a sequence of autonomous or semi-autonomous actions by the UAV 101 in accordance with one or more parameters.

An aerial vehicle can be a UAV. The UAV 101 may have one or more propulsion units 102 that may permit the UAV 101 to move about in the air. The one or more propulsion units 102 can be provided on an arm 103 of the UAV 101. The arm 103 can be connected to a body 104 of the UAV 101 on a proximal end of the arm 103. One or more propulsion units 102 can be connected to a distal end of the arm 103.

The one or more propulsion units 102 may enable the UAV 101 to move about one or more, two or more, three or more, four or more, five or more, six or more degrees of freedom. In some instances, the UAV 101 may be able to rotate about one, two, three or more axes of rotation. The axes of rotation may be orthogonal to one another. The axes of rotation may remain orthogonal to one another throughout the course of the UAV's flight. The axes of rotation may include a pitch axis, roll axis, and/or yaw axis. The UAV 101 may be able to move along one or more dimensions. For example, the UAV 101 may be able to move upwards due to the lift generated by one or more rotors. In some instances, the UAV 101 may be capable of moving along a Z axis (which may be up relative to the UAV orientation), an X axis, and/or a Y axis (which may be lateral). The UAV may be capable of moving along one, two, or three axes that may be orthogonal to one another.

The UAV may be a rotorcraft. In some instances, the UAV may be a multi-rotor craft that may include a plurality of rotors. The plurality of rotors may be capable of rotating to generate lift for the UAV. The rotors may permit the UAV to take off and/or land vertically. The rotors may be propulsion units that may enable the UAV to move about freely through the air. The rotors may rotate at the same rate and/or may generate the same amount of lift or thrust. The rotors may optionally rotate at varying rates, which may generate different amounts of lift or thrust and/or permit the UAV to rotate. In some instances, one, two, three, four, five, six, seven, eight, nine, ten, or more rotors may be provided on a UAV. The rotors may be arranged so that their axes of rotation are parallel to one another. In some instances, the rotors may have axes of rotation that are at any angle relative to one another, which may affect the motion of the UAV.

The UAV shown may have a plurality of rotors. The rotors may connect to the body of the UAV which may comprise a control unit, one or more sensors, a processor, and a power source. The sensors may include vision sensors and/or other sensors that may collect information about the UAV environment. The information from the sensors may be used to determine a location of the UAV. The rotors may be connected to the body via one or more arms or extensions that may branch from a central portion of the body. For example, one or more arms may extend radially from a central body of the UAV, and may have rotors at or near the ends of the arms.

A vertical position and/or velocity of the UAV may be controlled by maintaining and/or adjusting output to one or more propulsion units of the UAV. For example, increasing the speed of rotation of one or more rotors of the UAV may aid in causing the UAV to increase in altitude or increase in altitude at a faster rate. Increasing the speed of rotation of the one or more rotors may increase the thrust of the rotors. Decreasing the speed of rotation of one or more rotors of the UAV may aid in causing the UAV to decrease in altitude or decrease in altitude at a faster rate. Decreasing the speed of rotation of the one or more rotors may decrease the thrust of the one or more rotors. When a UAV is taking off, the output provided to the propulsion units may be increased from its previous landed state. When the UAV is landing, the output provided to the propulsion units may be decreased from its previous flight state. The UAV may be configured to take off and/or land in a substantially vertical manner.

A lateral position and/or velocity of the UAV may be controlled by maintaining and/or adjusting output to one or more propulsion units of the UAV. The altitude of the UAV and the speed of rotation of one or more rotors of the UAV may affect the lateral movement of the UAV. For example, the UAV may be tilted in a particular direction to move in that direction and the speed of the rotors of the UAV may affect the speed of the lateral movement and/or trajectory of movement. Lateral position and/or velocity of the UAV may be controlled by varying or maintaining the speed of rotation of one or more rotors of the UAV.

The body 104 of the UAV 101 may be a central body. The central body may include a housing that may partially or completely enclose one or more electrical components therein. For instance, a flight control unit, one or more navigation units (e.g., GPS unit), communication units (e.g., wireless communication units), sensors, and/or power units may be provided within the central body.

The arms 103 of the UAV 101 can be tubes or rods. The proximal ends of the arms may be connected to the central body. The arms may be separately formed from the central body and/or a housing of the central body. The arms may be detachable from the central body and/or housing of the central body. Alternatively, the arms are not detachable. In some instances, the arms may be integrally formed with the central body and/or housing of the central body. The arms of the UAV can have a circular cross section. The arms of the UAV can have a square or rectangular cross section. The arms of the UAV can have an elliptical cross section. The arms of the UAV can be hollow tubes. The arms of the UAV can be solid tubes. The arms of the UAV can be formed from a metallic, plastic, or composite material. The arms of the UAV can be formed from a lightweight material. The arms of the UAV can be formed from carbon fiber.

A UAV in an extended state may be of large dimensions. The UAV in a compacted state may be of small dimensions. A UAV may have smaller dimensions when in a compacted state, than when the UAV is in an extended state. A footprint of a UAV may be larger in an extended state than in a compacted state. The height of the UAV may or may not change when the UAV changes between a compacted state and an extended state. The UAV may be capable of being lifted and/or carried by a human when the UAV is in the compacted state. The UAV may be capable of being carried by a human in one hand when the UAV is in a compacted state.

The UAV may have a greatest dimension (e.g., length, width, height, diagonal, diameter) of no more than 100 cm. In some instances, the greatest dimension may be less than or equal to 1 mm, 5 mm, 1 cm, 3 cm, 5 cm, 10 cm, 12 cm, 15 cm, 20 cm, 25 cm, 30 cm, 35 cm, 40 cm, 45 cm, 50 cm, 55 cm, 60 cm, 65 cm, 70 cm, 75 cm, 80 cm, 85 cm, 90 cm, 95 cm, 100 cm, 110 cm, 120 cm, 130 cm, 140 cm, 150 cm, 160 cm, 170 cm, 180 cm, 190 cm, 200 cm, 220 cm, 250 cm, or 300 cm. Optionally, the greatest dimension of the UAV may be greater than or equal to any of the values described herein. The UAV may have a greatest dimension falling within a range between any two of the values described herein. Such greatest dimension for the UAV may be provided when the UAV is in an extended state. Optionally, such greatest dimension for the UAV may be provided when the UAV is in a compacted state. A greatest dimension of the UAV in a compacted state may be less than or equal to 40%, 50%, 60%, 70%, 80%, 90% of a greatest dimension of the UAV in an extended state.

The UAV 101 may be lightweight UAV. For example, the UAV may weigh less than or equal to 1 mg, 5 mg, 10 mg, 50 mg, 100 mg, 500 mg, 1 g, 2 g, 3 g, 5 g, 7 g, 10 g, 12 g, 15 g, 20 g, 25 g, 30 g, 35 g, 40 g, 45 g, 50 g, 60 g, 70 g, 80 g, 90 g, 100 g, 120 g, 150 g, 200 g, 250 g, 300 g, 350 g, 400 g, 450 g, 500 g, 600 g, 700 g, 800 g, 900 g, 1 kg, 1.1 kg, 1.2 kg, 1.3 kg, 1.4 kg, 1.5 kg, 1.7 kg, 2 kg, 2.2 kg, 2.5 kg, 3 kg, 3.5 kg, 4 kg, 4.5 kg, 5 kg, 5.5 kg, 6 kg, 6.5 kg, 7 kg, 7.5 kg, 8 kg, 8.5 kg, 9 kg, 9.5 kg, 10 kg, 11 kg, 12 kg, 13 kg, 14 kg, 15 kg, 17 kg, or 20 kg. The UAV may have a weight greater than or equal to any of the values described herein. The UAV may have a weight falling within a range between any two of the values described herein.

Figure 2:
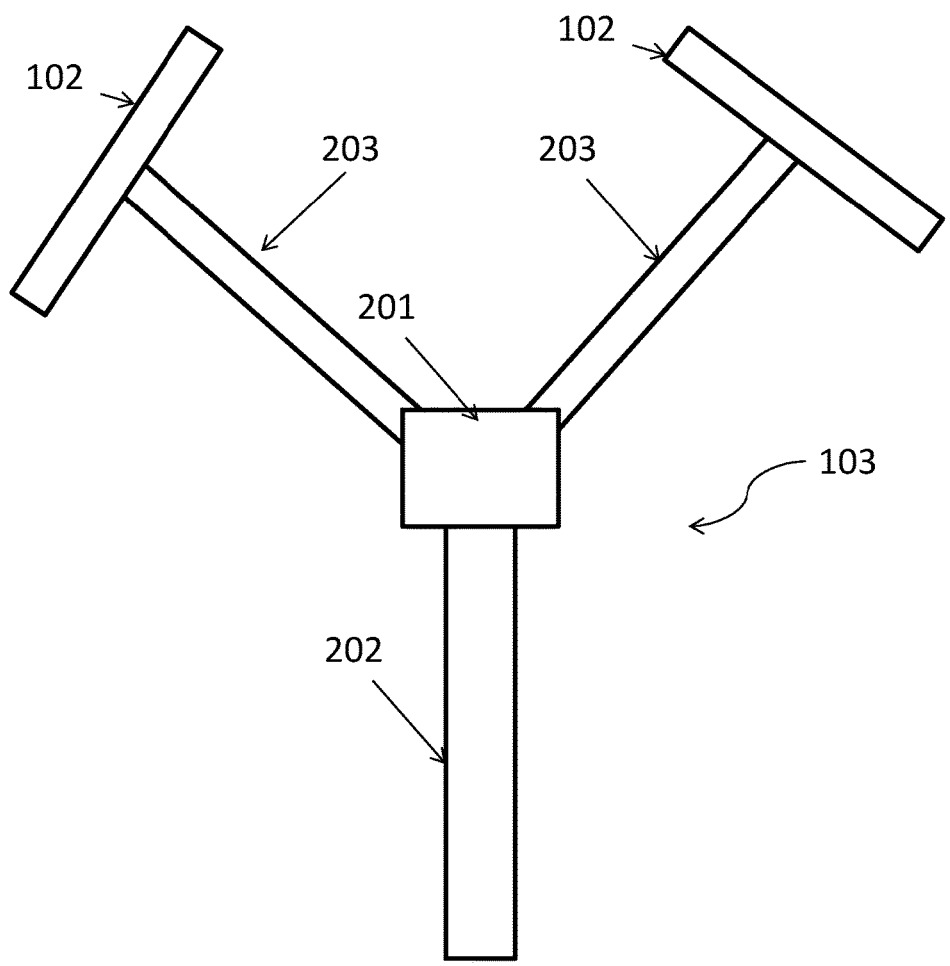
FIG. 2 shows a segmented arm of a UAV.

FIG. 2 shows an arm 203 of the UAV. An arm of the UAV can extend out from the body of the UAV. The arm can be configured to support one or more propulsion units of the UAV. The arm may extend the one or more propulsion units away from the body of the UAV when the UAV is in flight. The arm can comprise one or more joints 201. The one or more joints 201 can segment the arm into a stem portion 202 and one or more branch portions 203. The stem portion may be a portion of the arm proximal to the central body. The stem portion may be directly supported by the body or connected to the body. In some cases, the stem portion can be integrally formed with the body. The body and one or more stem portions can be a single piece. In some instances, a single stem portion may be provided on an arm. Alternatively, multiple stem portions may be provided on the arm. The one or more branch portions may be a portion of the arm distal to the central body. In some implementations, the one or more branch portions may not directly contact or be connected to the body. The one or more branch portions may be supported by the stem, which may be supported by the central body. Any number of branch portions may be provided. For instance, one or more, two or more, three or more, four or more, five or more, six or more, seven or more, or eight or more branch portions may be provided on the arm. In some embodiments, multiple branch portions may be supported by the stem portion. Two branch portions can extend from the stem portion to form a y-shaped arm. The joint may be used to connect the stem portion and the one or more branch portions. In some cases, the joint can be integrally formed with the stem portion. The joint and one or more stem portions can be a single piece. Additionally or alternatively, the joint can be integrally formed with the one or more branch portions. The joint and one or more of the one or more branch portions can be a single piece. In some cases, more than two branch portions can extend from the stem portion. The branch portions can be symmetric about a longitudinal axis of the stem portion. Alternatively, the branch portions can be asymmetric about a longitudinal axis of the stem portion. The stem portion can connect to the body of the UAV on a proximal end of the stem portion. The stem portion can connect to the joint on a distal end of the stem portion. The one or more branch portions can connect to the joint on a proximal end of each of the branch portions.

Figure 18:
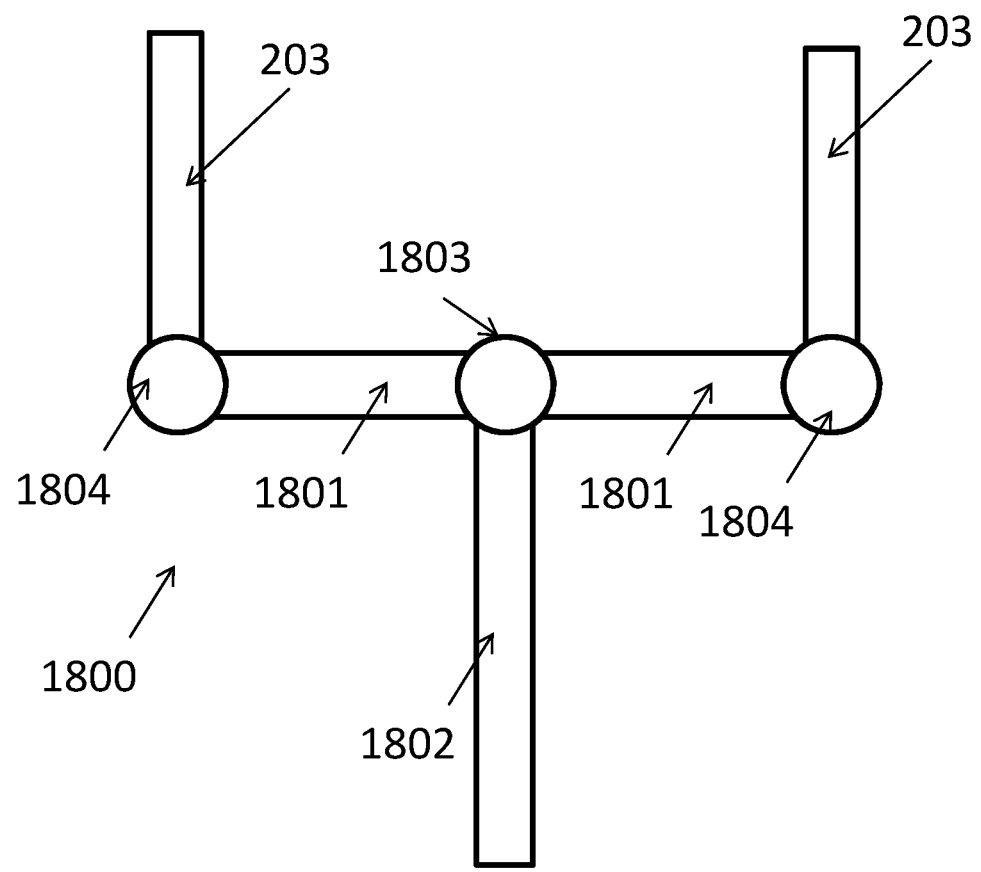
FIG. 18 shows a transformable arm comprising a plurality of first connecting portions and a second connecting portion.

In some cases, the arm can comprise a transformable stem portion as shown in FIG. 18. The transformable stem portion 1800 can comprise two or more first connection portions 1801. The first connection portions 1801 can be connected to a second connection portion 1802. The first connection portions and the second connection portion can be connected by a joint 1803. The joint can have any features of the joints described herein. Similarly the first connection portions can each be connected to one or more branch portions 203. The one or more branch portions can have any characteristics of the branch portions described herein. The branch portions can be connected to the first connection portions by a joint 1804. The joint can have any characteristics of a joint described herein. The first connection portions can move horizontally relative to the second connection portion. The first connection portions can move horizontally relative to the central body of the UAV. The first connection portions can move vertically relative to the second connection portion. The first connection portions can move vertically relative to the central body of the UAV. The first connection portions can move laterally relative to the second connection portion. The first connection portions can move laterally relative to the central body of the UAV. The first connection portions can be rotatable relative to the second connection portion. The first connection portions can be rotatable relative to the central body of the UAV. The second connection portion can move horizontally relative to the central body of the UAV. The second connection portion can move vertically relative to the central body of the UAV. The second connection portion can move laterally relative to the central body of the UAV. The second connection portion can be rotatable relative to the central body of the UAV.

The branch portion can be moved relative to the stem portion to transform the UAV between extended and compacted states. The branch portion may be movable relative to the stem portion. An angle between the branch portion and the stem portion may be alterable while the stem portion and the branch portion remain connected to the joint. The branch portion may be horizontally movable relative to the stem portion. Horizontal movement may include movement along a plane that substantially passes through the central body of the UAV and multiple arms of the UAV. Horizontal movement may include movement along a plane that substantially passes through all the joints of the UAV arms. Horizontal movement may be movement laterally with respect to a UAV body orientation.

In some cases, an angle between the branch portion and the stem portion can be greater than 90° when the branch portion is in an extended state. In some cases, an angle between the branch portion and the stem portion can be less than 90° when the branch portion is in a compacted state. An angle between the branch portion and the stem portion can be greater than a threshold angle when the branch portion is in an extended state, and an angle between the branch portion and the stem portion can be less than a threshold angle branch portion is in a compacted state. The threshold angle may have any numerical value, such as 30 degrees, 45 degrees, 60 degrees, 75 degrees, 90 degrees, 105 degrees, 120 degrees, 135 degrees, or 150 degrees. In some cases, an angle between a branch portion and the stem portion when the branch portion is in an extended state can be greater than an angle between a branch portion and the stem portion when the branch portion is in the compacted state. In some embodiments, the angle values between the branch portion and the stem portion in the extended and compacted states may be selected based on a number of arms of the UAV.

The branch portions can connect to one or more propulsions units on a distal end of each of the branch portions. The propulsion units may be at or near a distal end of the branch portion. The propulsion units may be within less than or equal to 1%, 3%, 5%, 10%, 15%, 20%, 25%, 30%, 40%, or 50% of the distal end of the branch portion along the length of the branch portion. In some cases, the propulsion unit can include one or more rotor. Each rotor can have one or more shafts configured to accept one or more blades. Each rotor can comprise two or more blades. Each rotor can comprise two or more shafts with each shaft configured to accept a blade. Each of the blades can be movable relative to other blades. Two or more blades can be movable relative to one another. Blades on different shafts may be movable relative to one another. In some instances, a user may manually move blades relative to one another when the UAV is powered off. A user may fold the blades inwards when the UAV is in a compacted state to reduce the footprint of the UAV. The user may fold the blades outward when the UAV is in an extended state. Alternatively, the user need not fold the blade outward, and the blades may come outwards when the rotors are spinning. In some instances, the blades may rotate freely on their corresponding shafts.

The branch portion can be moved relative to the stem portion to transform the UAV between extended and compacted states, such that the location of the one or more rotors relative to the body of the UAV changes as the UAV is transformed between extended and compacted states. For instance, a distance from the body of the UAV (e.g., central body) to a rotor supported by a branch portion in the extended state can be greater than a distance from the body of the UAV (e.g., central body) to a rotor supported by a branch portion in the compacted state. When the UAV is transformed a horizontal distance between the rotor and the central body can be variable by a greater amount than a corresponding vertical distance. When the UAV is in a compacted state, a rotor may not have enough space to rotate because it may be in close proximity to the body of the UAV, other rotors, and/or arms of the UAV.

The UAV can be transformed between extended and compacted states by moving one or more of the branch portions relative to the stem portion to which the one or more branch portions are attached. The UAV can be transformed between extended and compacted states by moving one or more branch portions relative to a central body of the UAV. The one or more branch portions may move horizontally with respect to the central body of the UAV. In some embodiments, the stem portions may not move while the UAV is transformed. The stem portion may remain stationary with respect to the UAV body. The one or more branch portions may move with respect to the body of the UAV while the stem portion does not move with respect to the body of the UAV. In alternate embodiments, the stem portion may move relative to the UAV body. In some cases, transformation of the UAV between extended and compacted states may not include vertical motion of the one or more branch portions relative to the body of the UAV. In some cases, transformation of the UAV between extended and compacted states may not include vertical motion of the one or more branch portions relative to the stem portion. In some implementations, transformation of the UAV between extended and compacted states may not include vertical motion of the rotors with respect to the body of the UAV, or with respect to a joint of the arm. Transformation of the UAV between extended and compacted states may include horizontal motion of the branch with respect to the stem, horizontal motion of the branch with respect to a central body of the UAV, and/or horizontal movement of a rotor with respect to a central body of the UAV. In some alternate cases, transformation of the UAV between extended and compacted states may not include horizontal motion of the one or more branch portions relative to the body of the UAV. In some cases, transformation of the UAV between extended and compacted states may include at most about 1°, 3°, 5°, 7°, 10°, 15°, 20°, or 30° of vertical motion of the one or more branch portions relative to the body of the UAV, one or more branch portions relative to the stem portion, and/or rotors with respect to the body of the UAV or a joint. In some cases, transformation of the UAV between extended and compacted states may include vertical motion of the one or more branch portions relative to the body of the UAV. Alternatively, little or no vertical motion may be provided as a result of transformation of the UAV between extended and compacted states. The arms of the UAV may remain substantially coplanar between the extended and the compacted states. The branch portions of multiple arms of the UAV may remain substantially coplanar between extended and compacted states. In some cases, transformation of the UAV between extended and compacted states may include lateral motion of the one or more branch portions relative to the body of the UAV. In some cases, transformation of the UAV between extended and compacted states may include rotational motion of the one or more branch portions relative to the body of the UAV.

The stem portion can be a tube or a rod. The stem portion can have a circular cross section. The stem portion can have a square or rectangular cross section. The stem portion can have an elliptical cross section. A major (i.e. longer) axis of the elliptical cross section may be horizontally oriented with respect to the UAV. This may result in stem portion being wider than it is tall. Alternatively, the major (i.e. longer) axis of the elliptical cross section may be vertically oriented. This may result in the stem portion being taller than it is wide. The stem portion can be a hollow tube. The stem portion can be a solid tube. The stem portion can be formed from a metallic, plastic, or composite material. The stem portion can be formed from a lightweight material. The stem portion can be formed from carbon fiber.

The branch portions can be a tube or a rod. The branch portions can have a circular cross section. The branch portions can have a square or rectangular cross section. The branch portions can have an elliptical cross section. A major (i.e. longer) axis of the elliptical cross section may be horizontally oriented with respect to the UAV. This may result in stem portion being wider than it is tall. Alternatively, the major (i.e. longer) axis of the elliptical cross section may be vertically oriented. This may result in the stem portion being taller than it is wide. The branch portions can be hollow tubes. The branch portions can be solid tubes. The branch portions can be formed from a metallic, plastic, or composite material. The branch portions can be formed from a lightweight material. The branch portions can be formed from carbon fiber.

In some cases, the stem portion and one or more of the branch portions can have the same cross sectional shape. The stem portion and one or more of the branch portions can have different cross sectional shapes. The stem portion and one or more of the branch portions can have the same diameter (or other dimension such as width, minor axis, major axis, etc.). One or more of the branch portions can have a smaller diameter than the stem portion. The dimensions of the branch portion cross-sections may be the same or different from the dimensions of the stem portion cross-sections. In some instances, one or more dimensions of the stem portion cross-section may be greater than one or more dimensions of the branch portion cross-sections. One or more of the branch portions can be configured to fit into the stem portion. One or more of the branch portions can have a larger diameter than the stem portion. One or more of the branch portions can be configured to fit over the stem portion.

A length of the stem portions and a length of at least one or more branch portions can be substantially equivalent. All of the branch portions can have the same length. Alternatively, one or more of the branch portions can have a length that is different from one or more other branch portions. The stem portion and at least one of the one or more branch portions can have different lengths. In some cases, the stem portion can be at least about 10%, 20%, 30%, 40%, 50%, 60%, 70%, 80%, 90%, 100%, 150%, 200%, 250%, or 300% longer than one or more of the branch portions. In some cases, the stem portion can be at least about 10%, 20%, 30%, 40%, 50%, 60%, 70%, 80%, 90%, 100%, 150%, 200%, 250%, or 300% shorter than one or more of the branch portions.

The stem and at least one of the branch portions can be permanently connected. The stem and at least one of the branch portions can be removably connected. The stem and branch portions may be detached and re-attached. The stem and the branch portions can be connected at the joint. The joint can permit movement of the one or more branch portions relative to the stem portion. The joint can permit lateral and rotational movement of the one or more branch portions. The joint can be a hinge, ball and socket, or sliding joint. In some cases, the joint can be a rigid connection that does not permit movement of the one or more branch portions relative to the stem portion. The joint can comprise a threaded connection, pin connection, magnetic connection, flange connection, or any other form of mechanical coupling. The joint may be hollow or have one or more internal passages or cavities.

The stem and the branch portions can be hollow to permit fluid and/or electrical routing from the body of the UAV to one or more rotors on the distal ends of the branch portions. The stem and/or branch portions can comprise one or more internal channels along the length of the stem and/or branch portion to permit internal fluid and/or electrical routing. The joint may also comprise one or more internal channels that permit internal fluid and/or electrical routing. An internal channel of a stem portion may be in fluidic communication with an internal channel of a branch portion. The internal channel of the stem portion may be in fluidic communication with an internal portion of a joint, which may be in fluidic communication with the internal channel of the branch portion. In some cases, a power source such as a battery, a generator, or a combustion engine can be provided in the body of the UAV. The one or more rotors can be in electrical communication with the power source through electrical transmission lines routed through the stem and/or branch portions. The electrical transmission lines may be routed through the stem portion, a portion of the joint, and one or more branch portions. Power can be transmitted to the power source through the electrical transmission lines. Other electrical signals, to and/or from the rotors may be transmitted through the electrical transmission lines.

Figure 3:
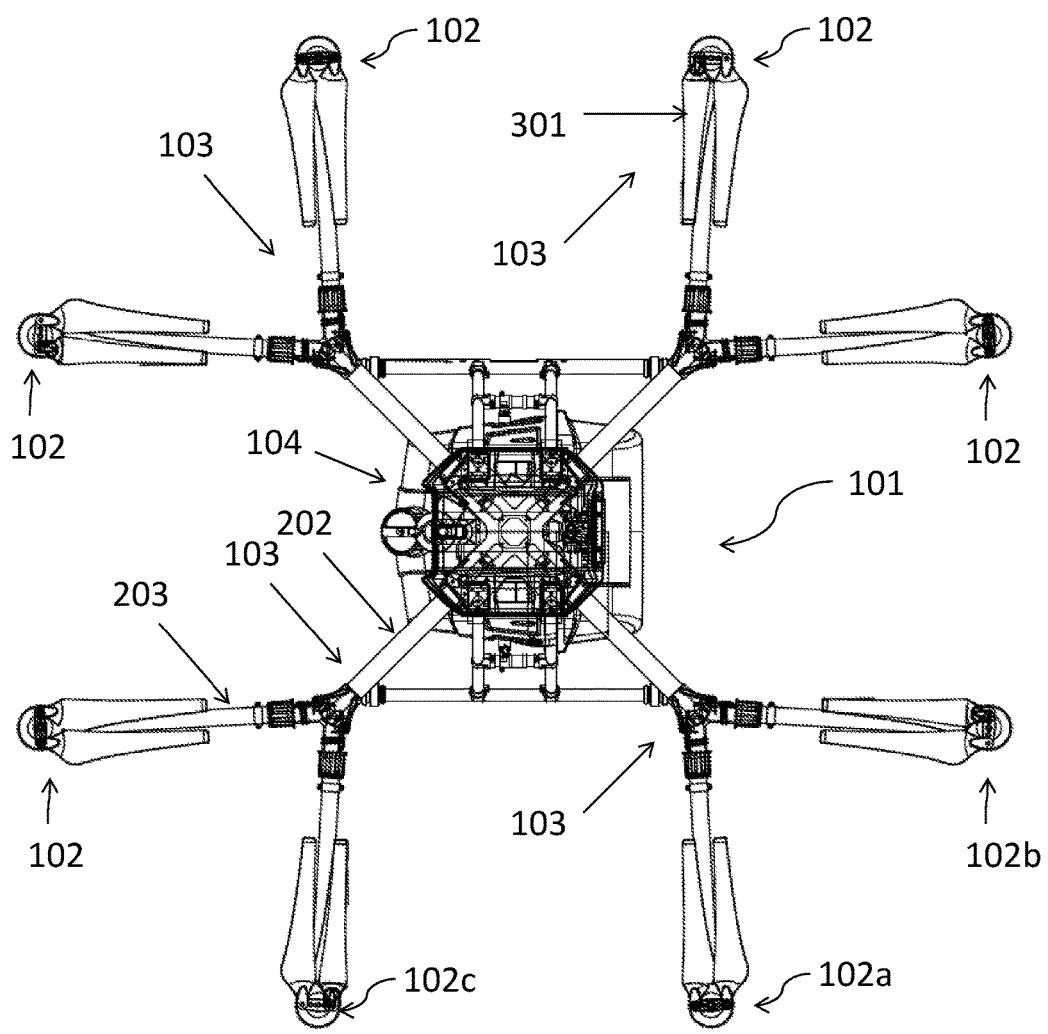
FIG. 3 shows a UAV in an extended state.

FIG. 3 shows a UAV 101 with a plurality of arms 103 extending from the body 104 of the UAV. The UAV shown in FIG. 3 is in an extended state. A propulsion unit 102 can be attached to a distal end of each branch portion. Each propulsion unit 102 can comprise one or more rotor blades 301. The one or more rotor blades can be folded or extended. In a folded state a longitudinal axis of the rotor blades can be parallel to a longitudinal axis of the branch portion on which the rotor is attached. The rotors shown in FIG. 3 are in a folded state with the rotor blades folded. In an extended state the longitudinal axis of the rotor blade can be perpendicular to the longitudinal axis of the branch portion on which the rotor blade is attached. In some cases, the longitudinal axis of the rotor blade can be at an angle greater than zero degrees relative to the longitudinal axis of the branch portion on which the rotor blade is attached when the rotor blade is in an extended state.

The UAV may have any number of arms. For example, the UAV may have four arms, as illustrated. In other embodiments, the UAV may have two, three, four, five, six, seven, eight, nine, ten, or more arms. The arms may be spaced apart evenly. The arms may extend from the central body of the UAV so that the same angle is between each arm. For instance, if N arms are provided, the angle between the arms may be 360/N. For instance, if four arms are provided, the angles between the arms may be 90 degrees. If six arms are provided, the angles between the arms may be 60 degrees. Alternatively, the arms need not be evenly spaced apart.

When in an extended state, the propulsion units of the UAV may be relatively evenly spaced apart. The distance from a propulsion unit to the adjacent propulsion units may be relatively similar. For instance, a distance from a first propulsion unit 102a to a second propulsion unit 102b may be relatively similar to a distance between the first propulsion unit 102a to a third propulsion unit 102c. These distances may vary by less than about 1%, 3%, 5%, 7%, 10%, 15%, 20%, 25%, or 30%. These distances may vary by less than about 1 cm, 3 cm, 5 cm, 7 cm, 10 cm, 15 cm, 20 cm, 25 cm, or 30 cm. In some instances, angles of the branch portions with respect to the stem portion in in the extended state may be selected to provide this even spacing of the propulsion units.

Figure 16:
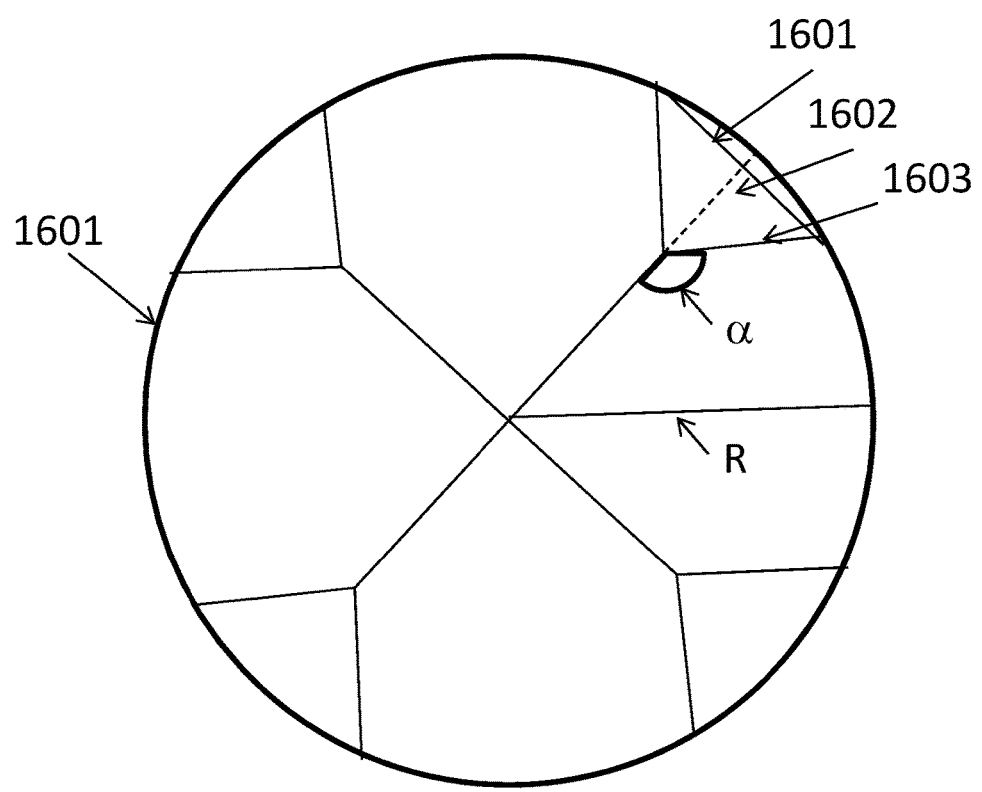
FIG. 16 shows a graphical representation of design parameters that can be chosen to maintain stability of the UAV while the UAV is in use.

In some cases, the angles of the branch portions with respect to the stem portion in in the extended state may be selected such that the UAV maintains stable operation during use. Similarly the length of the one or more branch portions can be chosen such that the UAV maintains stable operation during use. FIG. 16 shows a graphical representation of the arms. An area 1601 around the arms can be represented by a bounding circle. The bounding circle can have a radius R. The radius R can be measured from a point where the one or more arms connects to the body of the UAV to a tip of the arm. The tip of the arm can be the distal end of one or more branch portions.

A chord 1602 can be drawn between two or more distal ends of two or more branch portions that extend from the same stem portion. The chord can connect the two or more distal ends of the two or more branch portions that extend from the same stem portion. A line 1602 can be drawn along the length of the stem portion to the chord. The line can bisect the chord. The line and a half of the chord can form a right angle. The line can be perpendicular to the chord. A hypotenuse 1603 can connect and end of the line and an end of the chord to form a triangle. The triangle can be a right triangle. The hypotenuse can substantially overlap with a longitudinal axis of a branch portion that extends from the stem portion. The length of the hypotenuse can be represented by variable L1. The length of the hypotenuse can be equal to the length of the branch portion. An angle between the hypotenuse and the stem portion can be represented by $\alpha$. The angle $\alpha$ can be the angle between the stem portion and the branch portion.

The length L1 and the angle $\alpha$ can be variable design parameters determined by the length of the one or more branch portions and the angle between each branch portion and each stem portion to which the branch portions are connected. The design parameters L1 and $\alpha$ can be chosen such that the UAV has stable operation. The design parameters that permit stable operation can be dependent on the number of stems and/or the number of branches of the UAV. In some cases, the design parameters can be chosen such that the following relationship is satisfied, $$L1 \cdot \sin(180° - \alpha) \cdot 2 = R \cdot \sin\left(\frac{180°}{2n}\right) \cdot 2.$$

where n can be the number of stem portions or the number of branch portions.

The UAV may be capable of flight while in the extended state. A UAV may be transformed from a compacted state to an extended state with manual aid of a user. A user may manually move the branch portions to put the UAV in the extended state. In some instances, a user may manually lock the branch portions into an extended position, as described in greater detail elsewhere herein. In alternate embodiments, the UAV can be transformed into an extended state in response to an electronic signal that provides a command to transform from the extended state to the compacted state. The electronic signal can originate from a system on-board the UAV. The electronic signal can originate from a system off-board the UAV. Such transformation may occur without requiring manual interference from the user. One or more actuators may be provided on the arms that may respond to signal and effect transformation of the UAV.

Figure 4:
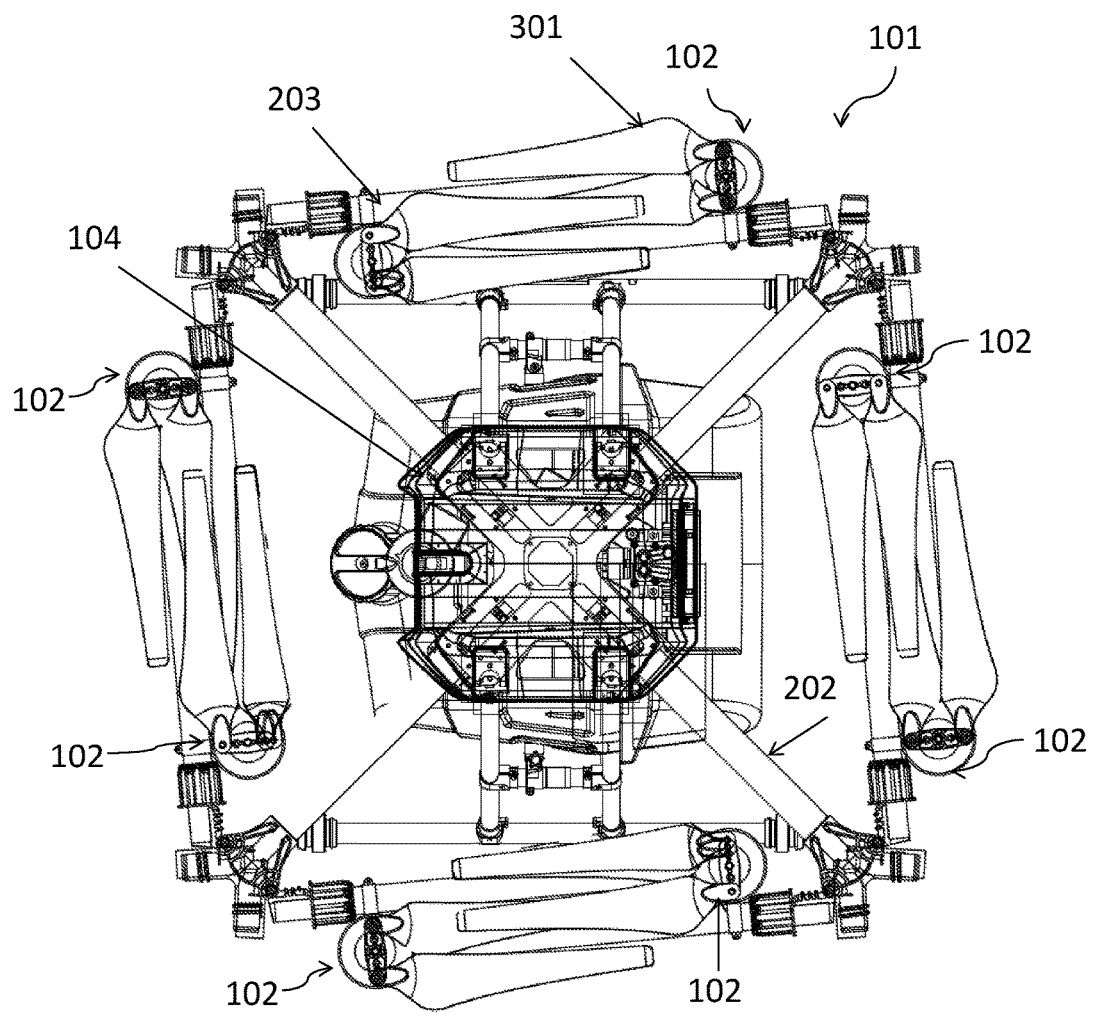
FIG. 4 shows a UAV in a compacted state.

FIG. 4 shows the UAV 101 in a compacted state. The UAV can fit into a smaller volume in the compacted state compared to the extended state. In some embodiments, the volume taken up by the UAV in a compacted state may be less than or equal to about 80%, 70%, 60%, 50%, 40%, 30%, 25%, 20%, 15%, or 10% of the volume taken up by the UAV in an extended state. In some embodiments, a footprint of the UAV (e.g., lateral cross-section) taken up by the UAV in a compacted state may be less than or equal to about 80%, 70%, 60%, 50%, 40%, 30%, 25%, 20%, 15%, or 10% of the footprint taken up by the UAV in an extended state. In some embodiments, a maximum dimension of the UAV in a compacted state may be less than or equal to 80%, 70%, 60%, 50%, 40%, 30%, 25%, 20%, 15%, or 10% of the maximum dimension of the UAV in an extended state. A height of the UAV may or may not change between the compacted state and the extended state. A weight of the UAV may or may not change between the compacted state and the extended state.

The UAV may not be capable of locomotion (e.g., flight) in the compacted state. When the UAV is in the compacted state the UAV can have a volume that permits the user to carry the UAV. When the UAV is in the compacted state the UAV can have a volume that permits the UAV to be placed in a vehicle for transport of the UAV. The compacted state may advantageously cause the UAV to take up less space for ease of transport. For instance, a UAV may more easily fit into a vehicle, or more UAVs may be fit onto the same vehicle. Similarly, a user may more easily handle or carry a UAV when in a compacted state compared to an extended state.

A user can transform the UAV from the extended state to the compacted state. For instance, the user may manually move the branch portions to transform the UAV from the extended state to the compacted state. The user may or may not unlock the branch portions from their extended configuration prior to moving the branch portions. A user may or may not lock the branch portions into a compacted state. The UAV can automatically transition from the extended state to the compacted state without intervention by a user. The UAV can be transformed from an extended state to a compacted state in response to an electronic signal that provides a command to transform from the extended state to the compacted state. The electronic signal can originate from a system on-board the UAV. The electronic signal can originate from a system off-board the UAV. Such transformation may occur without requiring manual interference from the user. One or more actuators may be provided on the arms that may respond to signal and effect transformation of the UAV.

A method of deployment of a UAV may be provided. The method may include providing the UAV in a compact state while the UAV is transported. For instance, a UAV may be transported from a first area to a second area. The UAV may be transported with aid of a motor vehicle, a manual vehicle (e.g., cart or wagon), or may be carried by an individual. The UAV may be transported while in its compacted state. In some embodiments, multiple UAVs may be transported together in their compacted state. Providing the UAVs in their compacted state may permit greater ease of transportation. When the UAV has reached its destination, the UAV may be put into a position from which the UAV will take off. The UAV may be unloaded from a motor or manual vehicle. The UAV may be manually placed at a location. The UAV may be more easily carried from a vehicle to the location by the user in its compacted state.

The UAV may be transformed from the compacted state to the extended state. The UAV may be manually transformed by the user, or may be automatically transformed in response to a signal, as previously described. In some embodiments, a UAV may be locked into an extended state. In some instances, multiple UAVs may be deployed at an area.

When the UAV is finalized in its extended state, the UAV may be powered on and/or instructed to fly. In some instances, the UAV is powered on after it is transformed into its extended state. For instance if a user is manually adjusting the arms of the UAV, it may be desirable to keep the UAV powered off to prevent the rotors from turning on while the user is adjusting the arms. In some instances, the UAV may be able to detect if the UAV is not yet locked into the extended state and may prevent propulsion units from operating, even if the UAV is powered on, until it is verified that the UAV is in the extended state. A UAV may be prevented from causing operation of the propulsion units while the UAV is in a compacted state, while the UAV is being transformed between extended and compacted states. This may be a safety feature that may help prevent injury to a user of the UAV. Similarly, it may prevent a user from accidentally turning on the UAV while it is in a compacted state, which could cause damage to the UAV or injury to bystanders. The UAV may be capable of flight only in its extended state. The UAV may be transformed between states while the UAV is landed and not in flight. In some instances, the UAV may be powered on before it is transformed into its extended state. For instance, if the UAV is automatically transforming in response to a signal, the UAV may be powered on to receive the signal and effect the transformation.

When the UAV is in its extended state, it may take-off and fly. The UAV may optionally deliver a product, such as an agricultural product, to its environment. The UAV may collect information about its environment. The UAV may communicate with a remote terminal. The remote terminal may provide signals for the UAV flight, for delivery product, and/or collection of information.

In the compacted state, the stem portion 202 of the arm can be in the same position as in the extended state. The orientation of the stem portion of the arm may not change when the UAV transitions from the extended state to the compacted state. The orientation of the branch portion 203 with respect to the UAV body may change when the UAV transitions from the extended state to the compacted state. Each branch portion can be arranged substantially parallel to a perimeter edge of the body of the UAV when the UAV is in the compacted state. A branch portion of a UAV on an arm may be substantially parallel (e.g., have an angular deviation of 1 degree or less, 3 degrees or less, 5 degrees or less, or 10 degrees or less) to another branch portion on an adjacent arm. Each branch portion can be moved horizontally relative to the stem portion to transform the UAV from the extended state to the compacted state. Each branch portion can be moved horizontally by rotating/pivoting the branch portion about the joint which connects the branch portion to the corresponding stem portion. The branch portion may swing laterally between the extended state and the compacted state. Little or no vertical motion may be provided when the branch portion swings between the extended state and the compacted state. In some instances, vertical motion may be provided. The vertical motion may be less than the lateral motion. The amount of vertical motion may be less than or equal to about 1%, 5%, 10%, 20%, 30%, 40%, 50%, 60%, 70%, 80%, or 90% of the amount of horizontal motion.

The one or more rotor blades 301 can be in a folded state when the UAV is in a compacted state. In a folded state, a longitudinal axis of the rotor blade can be parallel to a longitudinal axis of the branch portion on which the rotor blade is attached.

Figure 15:
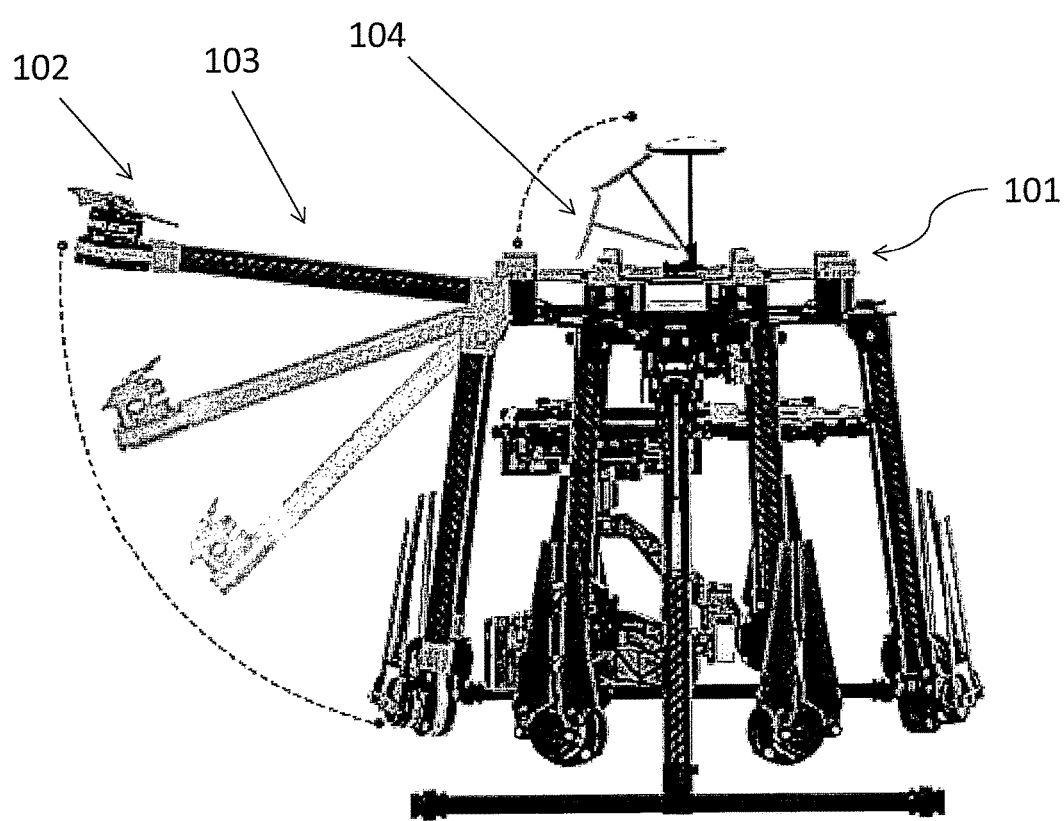
FIG. 15 shows a UAV in which the arms are not segmented and the arms are moveable relative to the central body through a joint that connects the arms to the central body.

In some cases, the UAV can be in a compacted state where the arms 103 are folded vertically as shown in FIG. 15. In a compacted state the rotors 102 attached to the branch portions can be below the central body 104 of the UAV. In some cases, the arm may not be segmented into two or more portions. The arm can be connected to the central body by a joint. The entire arm can be moveable relative the central body about the joint. In some cases, the arm can be segmented into a stem portion and one or more branch portions. The stem portions and the one or more branch portions can be connected by a joint. Alternatively the one or more branch portions can be connected to a joint that connects to the central body of the UAV. The arm may not have a stem portion. The one or more branch portions may not be separated from the central body of the UAV by a stem portion. The one or more branch can move horizontally relative to the central body of the UAV. The one or more branch portions can move vertically relative to the central body of the UAV.

Figure 5:
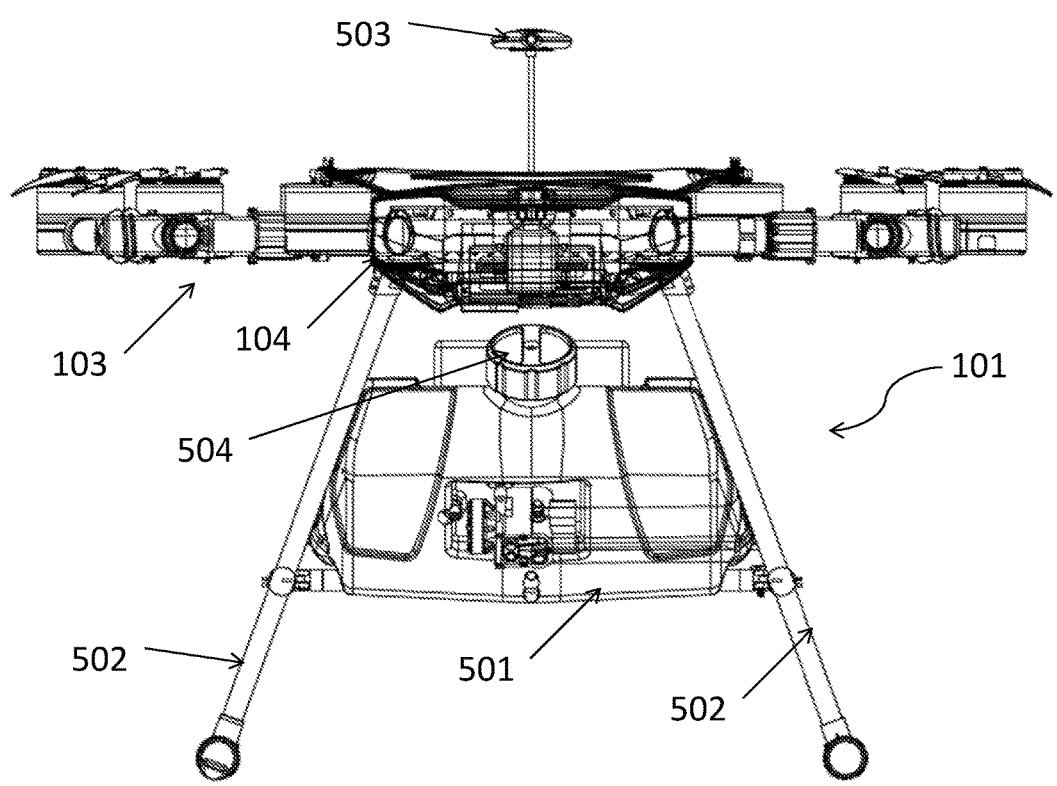
FIG. 5 shows a side view of a UAV in a compacted state carrying a payload.

FIG. 5 shows a side view of a UAV 101 in a compacted state. The central body 104 of the UAV can be supported by one or more legs 502. The legs can comprise a landing skiff. The legs can be rested on a surface when the UAV is landed. The legs can be configured to absorb force when the UAV lands. The arms of the UAV can be co-planar with the central body of the UAV. In some cases, a payload 501 can be attached to the UAV. The payload can be attached to the central body of the UAV. The payload can be attached to one or more of the legs. The legs can provide a separation distance between the UAV and the payload.

A compass 503 can be attached to the central body of the UAV. The compass can extend from the central body of the UAV. The compass can be in communication with one or more navigation units on-board the UAV. The compass can be configured to determine a directional heading of the UAV. The compass can transmit the directional heading of the UAV to one or more processors of a navigation control system on-board the UAV.

The UAV can hold a payload 501. The payload can be a tank that holds a volume of liquid. The tank can comprise a cap 504 that permits a user to refill the tank. The tank can hold an agricultural product. The tank can be attached to a body of the UAV. The tank can be attached to a landing skiff (e.g., legs) of the UAV. When the tank is connected to the landing skiff the tank can be separated from the body of the UAV. Contents of the tank can be prevented from contaminating the body of the UAV by the provided separation distance. In some cases, the UAV can detect a system failure that can cause the UAV to crash. When the system failure is detected, the UAV can eject the tank from the legs prior to crashing. The container can be a payload of the UAV. The agricultural product can be sprayed from the tank while the UAV is in flight. The tank can comprise a nozzle that permits the liquid volume to be sprayed from the tank. The UAV can traverse and environment and spray the agricultural product simultaneously. In some cases, the payload can be a vision sensor such as a camera.

Figure 6:
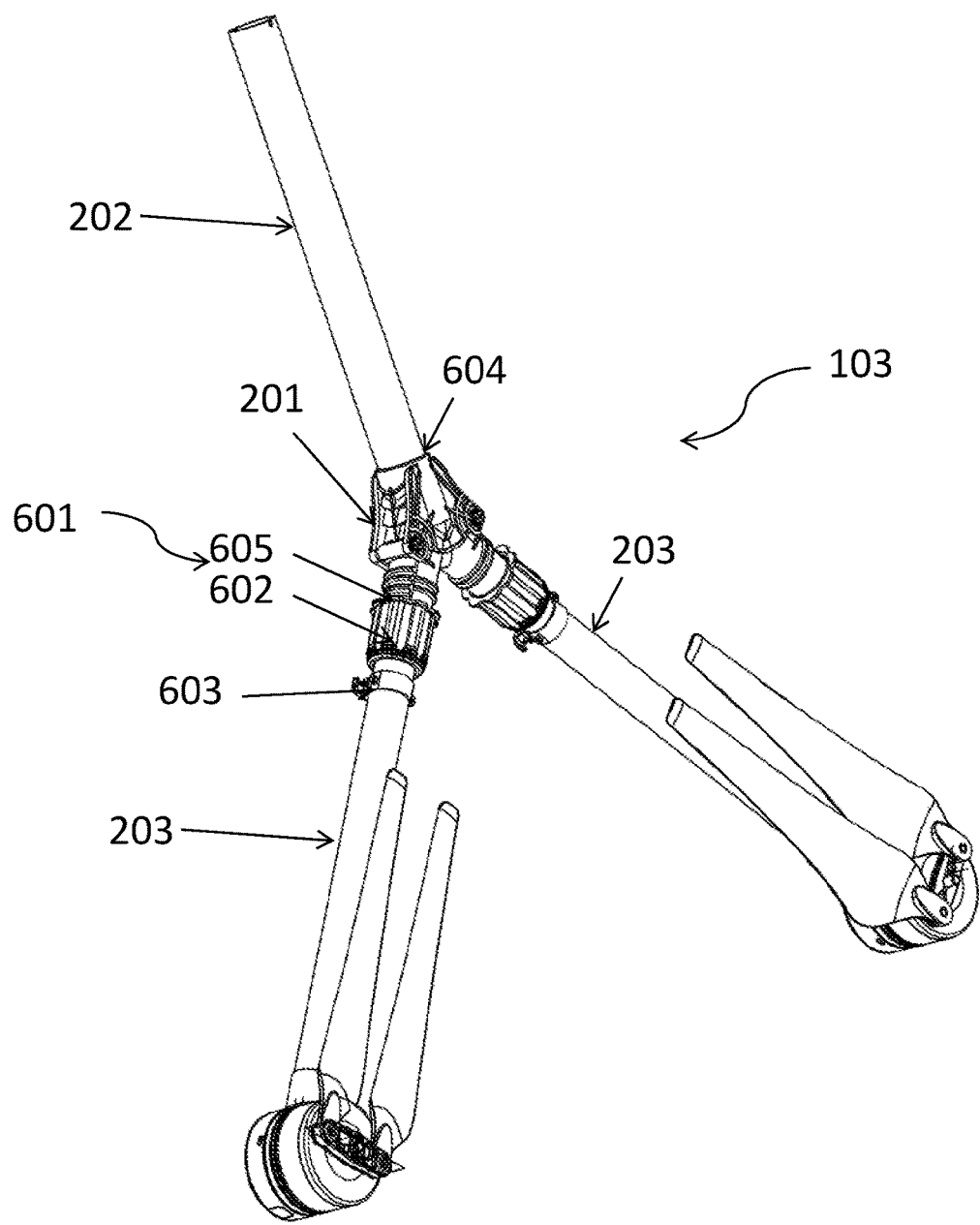
FIG. 6 shows a detailed view of a segmented arm of a UAV.

FIG. 6 shows an arm 103 that can be provided on the UAV. In some cases, the arm can be separable from the UAV. Additional and/or replacement arms can be provided separately from the UAV. Arms can be provided for purchase separate from the UAV. During use one or more of the arms on the UAV can become damaged. The arm can be replaced with a new arm without needing to replace the entire UAV.

The arm can be segmented by a joint 201. The joint 201 can connect to the stem portion 202 on a proximal end of the joint. The joint 201 can comprise one or more connection regions 604 for connecting to the stem portion. The connecting region can be an opening configured to accept insertion of the stem portion. The opening can form a snug fit with the stem portion such that the stem portion can be tightly fitted in the connecting region. The connecting region can slide over the stem portion. In some cases, the connecting region and the stem portion can comprise complementary mating features such as threads, slides/grooves/snaps, and/or magnets. In some cases, the connecting region and the stem portion can comprise complementary threads such that the stem portion can be screwed into the connecting region. Alternatively, the connecting region and the stem portion can comprise complementary threads such that the connection region can be screwed into the stem portion. In some cases, the connecting region can comprise a protrusion configured to fit into the stem portion. The protrusion can form a snug fit with the stem portion such that the protrusion can be tightly fitted in the stem portion. The stem portion can slide over the protrusion.

The stem portion and the joint can be separate pieces. The stem portion and the joint can be a single integral piece. The stem portion can be removably connected to the joint. Alternatively, the stem portion can be permanently connected to the joint, for example by a welded connection or an adhesive bond. An internal passage can be provided between the stem portion and the joint.

The joint 201 can connect to one or more branch portions 203 on a distal end of the joint. The distal end of the joint can comprise one or more connection regions 601 for connecting to one or more branch portions 203. Each connecting region can comprise a pivot region that permits a branch portion connected to the connection region to pivot about an axis with respect to the stem portion when the branch portion is connected to the connection region. A first connecting region can comprise a first pivot region that allows a first branch portion to pivot about an axis with respect to the stem portion. A second connecting region can comprise a second pivot region that allows a second branch portion to pivot about an axis with respect to the stem portion. The connecting region can be an opening configured to accept insertion of the branch portion. The opening can form a snug fit with the branch portion such that the branch portion can be tightly fitted in the connecting region. The connecting region can slide over the branch portion. In some cases, the connecting region and the branch portion can comprise complementary mating features such as threads, slides/grooves/snaps, and/or magnets. In some cases, the connecting region and the branch portion can comprise complementary threads such that the branch portion can be screwed into the connecting region. Alternatively, the connecting region and the branch portion can comprise complementary threads such that the connection region can be screwed into the branch portion. In some cases, the connecting region can comprise a protrusion configured to fit into the branch portion. The protrusion can form a snug fit with the branch portion such that the protrusion can be tightly fitted in the branch portion. The branch portion can slide over the protrusion.

The joint can have a y-shape in cases where the joint connects a stem portion to two branch portions. Alternatively the joint can have any other shapes, such as a V shape, a U-shape or a T-shape. In some cases, the joint can have a different shape when the joint connects a stem portion to one branch portion. The joint can have a substantially straight linear shape when the joint connects one branch portion to one stem portion. In some cases, the joint can connect a stem portion to more than two branch portions. The joint can have an octopus, star, or asterisk shape when the joint connects a stem portion to more than two branch portions.

The joint can comprise a locking mechanism configured to lock one or more branch portions in predetermined position relative to the stem portion. Locking the one or more branch portions relative to the stem portion can permit the UAV to maintain stability during locomotion (e.g., flight). The locking mechanism can lock one or more branch portions in predetermined position relative to the stem portion when the UAV is in an extended state. The locking mechanism can optionally lock one or more branch portions in predetermined position relative to the stem portion when the UAV is in a compacted state.

The locking mechanism can be a mating interface. A mating interface can be provided on an extension 605 of the joint. The locking mechanism can be a mating interface that forms a rigid connection between the joint and a corresponding branch portion. The locking mechanism can permit the joint and the branch portion to be locked and unlocked repeatedly. The locking mechanism can comprise a mating feature on either or both of the joint and the arm. In some cases complementary mating features can be provided on the joint and the arm.

The locking mechanism can comprise a sleeve. The sleeve can be a cylindrical cap that can surround an outer surface of the extension of the joint and/or the branch portion. The sleeve can be coaxial and/or concentric with a longitudinal axis of the extension of the joint and/or the branch portion. The sleeve can slide along a longitudinal axis of the extension of the joint and/or the branch portion. The sleeve can cover at least a portion of an end of the branch portion. The sleeve can cover at least a portion of an end of the joint.

In some cases, the locking mechanism can comprise a threaded locking mechanism. Alternatively the locking mechanism can comprise a pin locking mechanism. The pin can pass through a branch portion and a corresponding stem portion. In some cases, the pin can pass only through the branch portion and the joint or only between the stem and the joint. When a threaded locking mechanism is used, the threaded locking mechanism can include a threaded sleeve 602. The sleeve can be provided on either or both of the branch and a threaded extension on the joint. The threaded sleeve can comprise a cap with an inner threaded surface. The threaded sleeve can be permanently attached to the branch portion. The threaded sleeve can be an open cylindrical tube with a threaded interior. The threaded sleeve can be a female half of a threaded connection.

The threaded extension can be a tubular extension that protrudes from the joint. The threaded extension can have a threaded outer surface. The threaded extension can be a male half of a threaded connection. The threaded sleeve can be fitted over at least a portion of the branch portion. In an unlocked position the threaded sleeve can slide along the branch portion. The threaded sleeve can spin around the branch portion. The threaded sleeve can translate a long a longitudinal axis of the branch portion. In some cases, a clamp 603 can be provided on the branch to restrict movement of the sleeve to a fraction of the branch portion. The clamp can prevent the sleeve from sliding along the entire length of the branch portion while the branch portion is unlocked from the stem portion. Sliding of the sleeve along the length of the branch portion can scratch and/or damage the branch portion. In some cases, a bothersome noise can be generated by the sliding of the sleeve along the length of the branch portion.

The branch portion can be locked in a position relative to the stem by aligning the branch portion with the threaded extension of the joint. When the branch portion is aligned with the threaded extension of the joint a terminal end of the branch portion and a terminal end of the threaded extension can be flush with one another. When the branch portion is aligned with the threaded extension of the joint, a terminal end of the branch can be fitted inside of a terminal end of the threaded extension. When the branch portion is aligned with the threaded extension of the joint, a terminal end of the branch can be fitted over the terminal end of the threaded extension. Once the branch portion is aligned with the threaded extension of the joint, the threaded sleeve can be rotated to form a threaded connection between the sleeve and the threaded extension. When the threaded connection is formed movement of the branch portion relative to the stem portion may not be permitted. The sleeve can isolate an inner portion of the joint from an ambient environment. The sleeve can also isolate an interface between the joint and the branch portion. The sleeve can isolate one or more channels formed in an interior of the branch and/or the joint. The sleeve can prevent dust and/or water from contacting the inner portion of the joint. The sleeve can form a water tight and/or air tight seal around the inner portion of the joint.

When the branch portion is locked to the joint, the branch portion can be prevented from moving relative to the stem portion and/or the joint. The branch portion can be prevented from moving laterally and/or rotationally relative to the stem portion and/or the joint when the branch portion is locked to the joint. When the joint is locked to the branch portion, a path that permits the branch portion to move can be blocked, such that the branch portion is prevented from moving relative to the stem portion and/or the joint. When the joint is locked to the branch portion, the branch portion can be connected to a portion of the joint that is rigidly connected to the joint.

Figure 7:
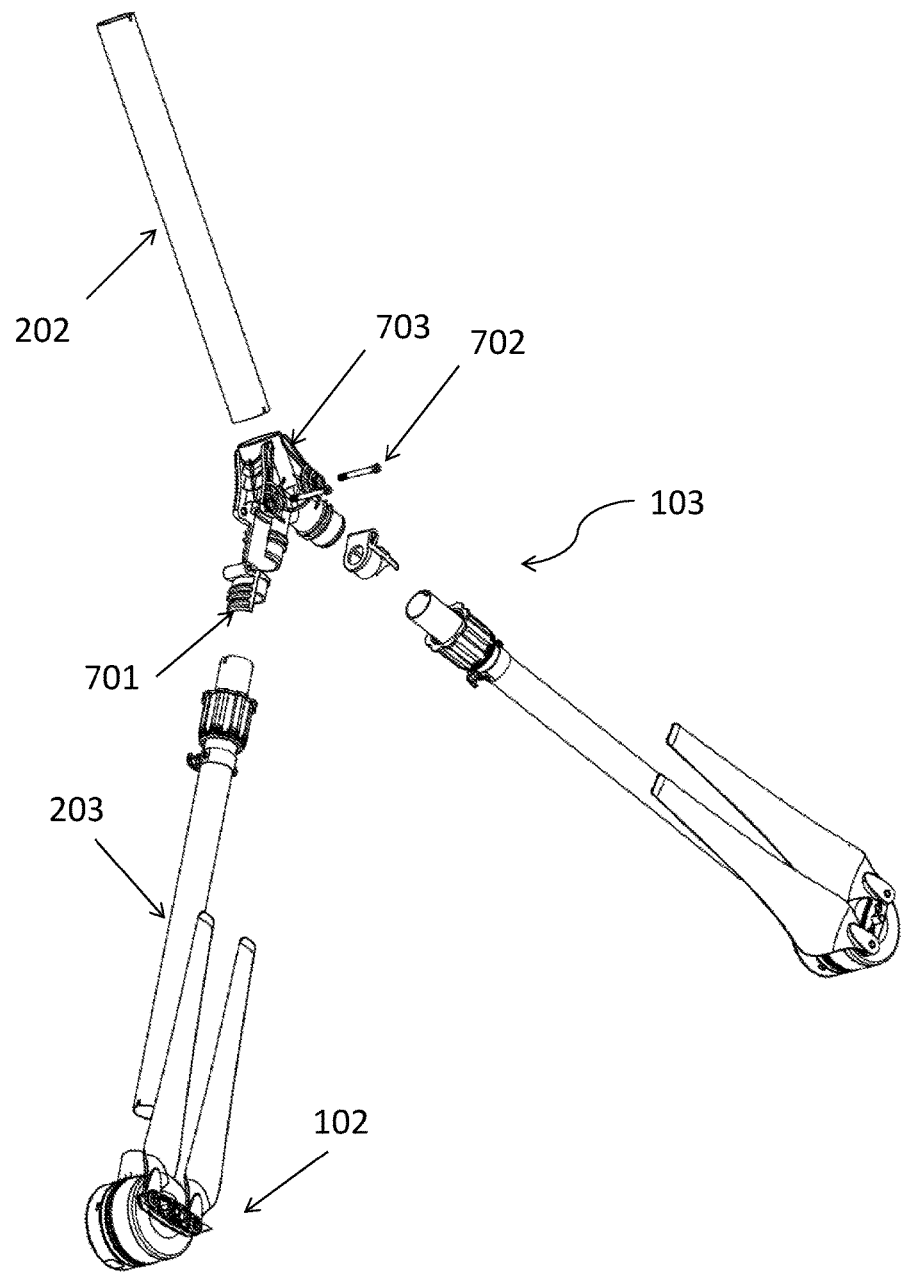
FIG. 7 shows an exploded view of a segmented arm of a UAV.

FIG. 7 shows an exploded view of the arm 103. The arm can comprise a stem portion configured to be proximal to a central body of the UAV when the arm is connected to the UAV and one or more branch portions configured to be distal to the central body of the UAV when the arm is connected to the UAV. The arm can include a joint system configured to connect the stem portion to one or more branch portions. When the arm is assembled the stem portion and/or one or more of the branch portions can be inserted within a corresponding region of the joint system.

The joint system can comprise one or more extensions that protrude from a body 703 of the joint. The one or more extensions can be configured to provide connection with the one or more branches. The one or more extensions can comprise a mating feature. A mating feature can be threads, pins, holes, grooves, protrusions, magnets, or any other mating feature. When the extension is connected to one or more of the branches a sleeve can be disposed over at least a portion of at least one of the stem portion, or the one or more branch portions and at least a portion of the corresponding threaded extensions (e.g., protrusions). The sleeve can comprise a mating feature that compliments the mating feature of the extension. In some cases the sleeve can have mating features such as threads, pins, holes, grooves, protrusions, magnets, or any other mating feature. The mating feature on either or both of the extension and the sleeve can be a threaded interface. The mating features on the extension and the sleeve can be a guide and a protrusion respectively. The mating features on the extension and the sleeve can be a protrusion and a guide respectively.

The joint can include an arm connection component 701. The arm connection component can be fitted inside the extension. The arm connection component can provide a portion of a mating feature that can be combined with the mating feature provided on the extension. In some cases, the arm connection component can comprise threads that can line up with a partial thread pattern provided on the extension. When the arm connection component is fitted in the extension the thread pattern can be complete and/or continuous.

The arm connection component can comprise a through hole. The through hole can be sized and shaped to receive a pin 702. The arm connection component can rotate about the pin. When the arm connection component is connected to the branch portion, the branch portion can rotate with the arm connection component about the pin. The through hole can be lines with a bearing to permit smooth rotation of a pin in the through hole. The body of the joint can have a top hole and a second hole configured to line up the through hole of the arm connection component when the arm connection component is fitted in the extension. The pin 702 can be inserted through the top hole, the through hole, and the bottom hole to connect the arm connection component to the joint body. The branch portion can rotate and or pivot about the pin when the branch portion is in an unlocked position.

The branch portion can be permanently connected to the arm connection component. The arm component and the branch portion can comprise complementary mating features such as threads, grooves, hole/protrusion, or any other mating feature that permits permanent or removable connection. The branch portion can be connected to the arm connection component when the branch portion is in a locked and unlocked position. The branch portion can be connected to the arm connection component when the branch portion is in a compacted and extended state.

The branch portion can only be movable relative to the stem portion when the branch portion is connected to the arm connection component and not the extension. When the branch portion is locked, the branch portion can be connected to the arm connection component and the extension, such that the branch portion may not be moveable relative to the stem portion.

A method of locking or unlocking the branch portion from the joint may be provided. A user can have a UAV with one or more branch portions in an unlocked state. The user can rotate the one or more unlocked branch portions such that the branch portion is flush and/or collinear with an extension of the joint. The user can rotate the branch portion about the pin. The user can then lock the branch portion to the joint by forming a lock between the branch portion and the joint with the locking mechanism. In some cases, the locking mechanism can include a threaded sleeve described herein. The user can rotate the sleeve to engage the threads of the sleeve with the threads on the extension until a tightened threaded connection is formed. The connection can be finger tight to avoid over tightening. The user can reverse these steps to unlock the branch portion from the joint.

One or more propulsion units 102 can be attached to a distal end of each of the branch portions. The propulsion unit can include one or more rotors. Each rotor can have one or more shafts configured to accept one or more blades. Each rotor can comprise two or more blades. Each rotor can comprise two or more shafts with each shaft configured to accept a blade. Each of the blades can be movable relative to other blades. Two or more blades can be movable relative to one another. A first branch portion can be oriented relative to one or more other blanch portions such that blades connected to the distal end of the first branch portion can rotate without contacting blades on any of the other branch portions. A first branch portion can be oriented relative to one or more other blanch portions such that blades connected to the distal end of the first branch can rotate without destabilizing one or more blades on any of the other branch portions. A first branch portion can be oriented relative to one or more other blanch portions such that blades connected to the distal end of the first branch can rotate without fluid dynamically hindering one or more blades on any of the other branch portions.

In some cases, the arm can comprise one or more seals. The seals can include one or more o-ring, gasket, or snap ring. When the UAV operates in an environment liquids and or dust can be present in the environment. When the UAV is operated in an agricultural environment the liquids and or dust can include agricultural products carried in a tank as a payload of the UAV. The liquid and/or dust can damage the joint, therefore providing seals to prevent liquid and/or dust from entering the joint can decrease or eliminate the probability of damage to the joint from liquids and/or dust.

Figure 8:
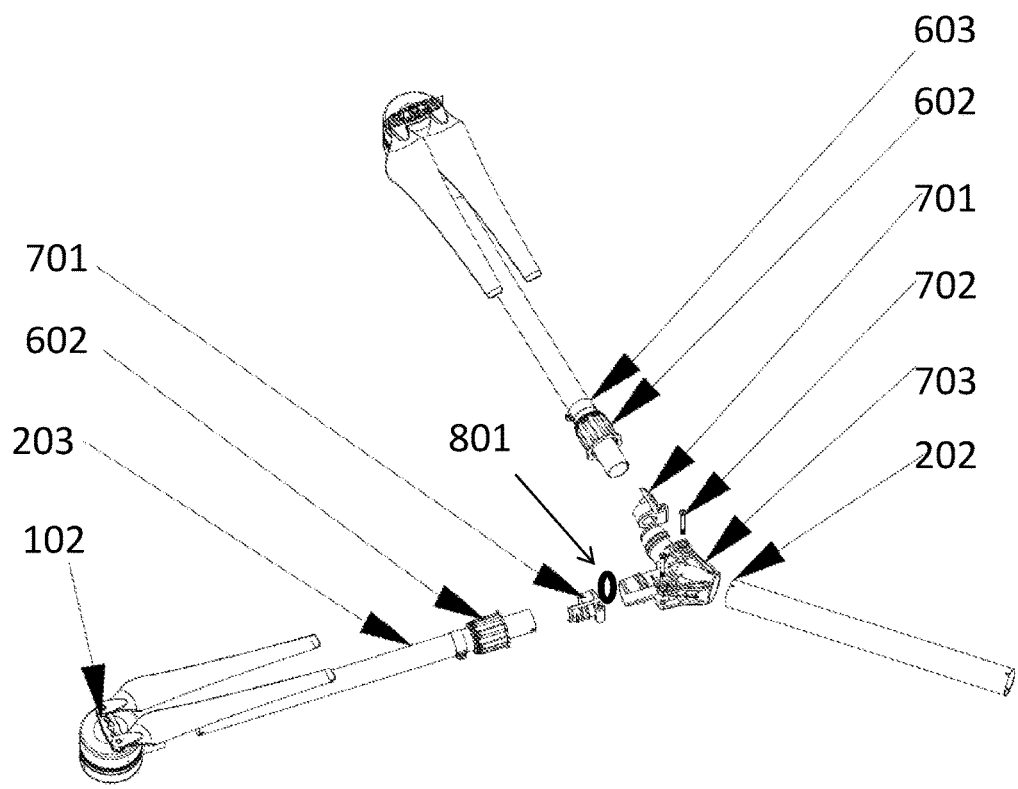
FIG. 8 shows an exploded view of a segmented arm of a UAV including a seal.

FIG. 8 shows an exploded view of the arm including the one or more seals. The arm can comprise a stem portion 202 and one or more branch portions 203. The one or more branch portions 203 can be connected to the stem portion by a joint 703. One or more rotors 102 can be provided on the distal ends of the branch portions. The one or more branch portions can be movable relative to the stem portion. The one or more branch portions can be movable relative to the stem portion by rotation of the one or more branch portions about a pin 702. A sealing ring 801 can be provided at a terminal end of the arm connection component. One or more seals can be provided at the terminal end of the arm connection component 701. When the arm connecting component is fitted in the extension the seal can be compressed between the end of the arm connection component and an inner surface of the body of the joint. In some cases, the seal can be a sealing ring. The sealing ring can be provided between the arm connecting component and at least one of the stem portion or one or more of the branch portions. In some cases, the seal can be provided by the sleeve described elsewhere herein.

A seal can be provided additionally or instead of the sealing ring 801 on the sleeve. The seal on the sleeve can form an air and/or water tight seal between the sleeve and the branch portion on which the sleeve is provided. The seal can be an o-ring or a gasket.

Figure 9:
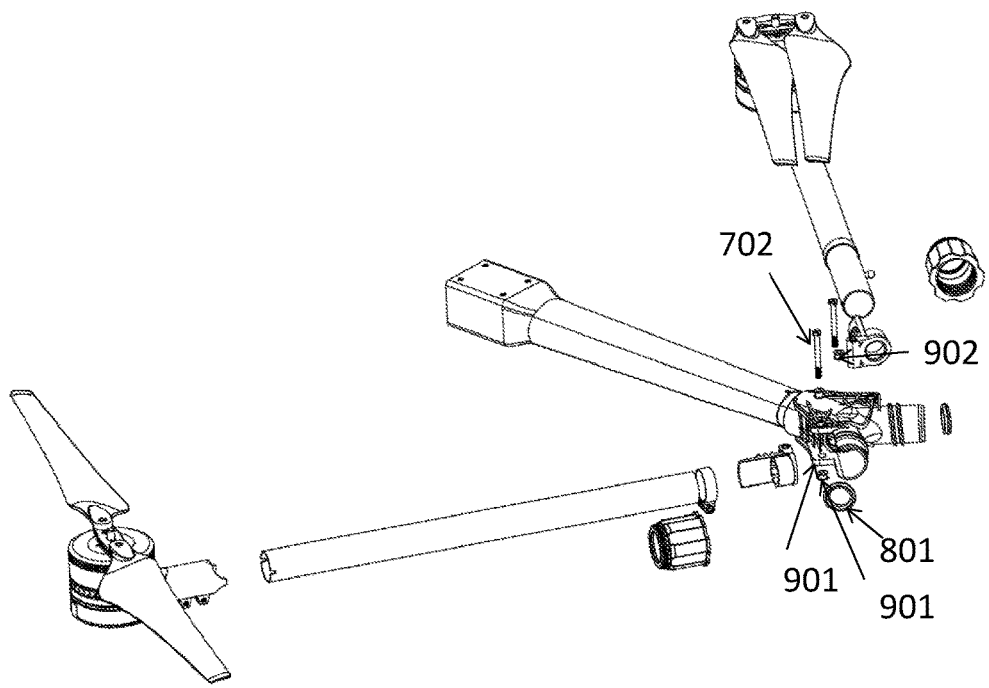
FIG. 9 shows an exploded view of a segmented arm of a UAV including a seal in a compacted state.

FIG. 9 shows another exploded view of the arm in which the branch portions are rotated towards the stem portion. The branch portions can be rotated towards the stem portion at shown in FIG. 9 when the UAV is in a compacted state. The branch portions can be rotated towards the stem portion by a rotation about the pin. The pin can be fixed in place by one or more circular guides 902. The circular guides can be attached to the body of the joint.

In the view shown in FIG. 9, the inner surface 901 of the body of the joint against which the sealing ring 801 is compressed by the arm connection component when the arm connection component is fitted in the extension is visible.

In some cases, the UAV can have an arm that provides an air tight and/or water tight seal without including a physical seal. In some cases, the stem portion can be connected to one or more of the branch portions by screwing the branch portion in the stem portion or screwing the stem portion into the branch portion. In the case in which the branch portion is screwed into the stem portion, the branch portion can have a smaller diameter than the stem. A portion of the outer surface of the branch portion can be threaded and a portion of the inner surface of the stem portion can be threaded. Alternatively, in the case in which the stem portion is screwed into the branch portion, the branch portion can have a larger diameter than the stem portion. A portion of the inner surface of the branch portion can be threaded and a portion of the outer surface of the stem portion can be threaded.

Figure 10:
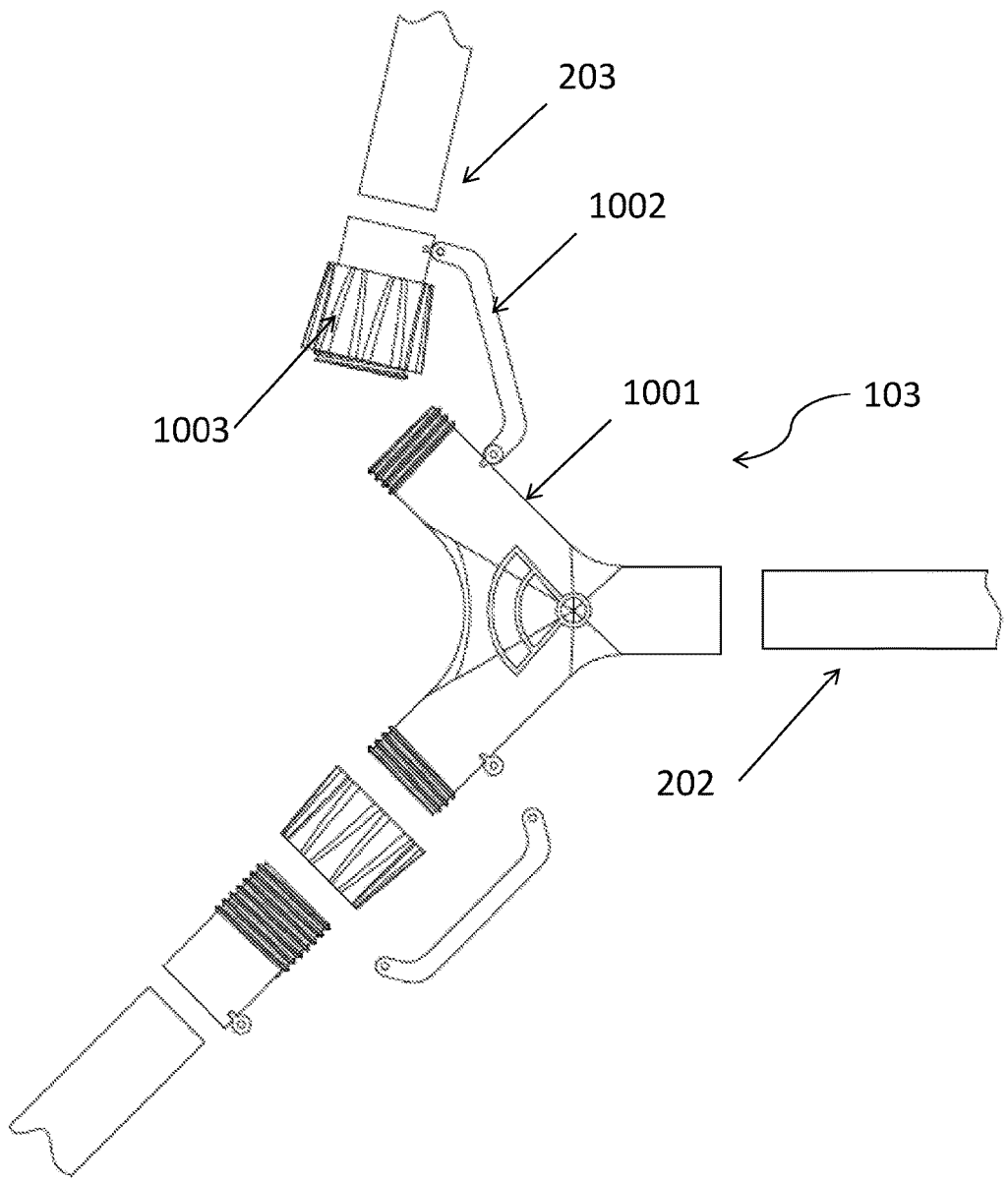
FIG. 10 shows an exploded view of a segmented arm of a UAV that does not include a seal.

In some instances, the UAV can have an arm that provides an air tight and/or water tight seal without including a physical seal. The seal can be provided by a sleeve that connects the stem portion to the one or more branch portions. The seal may directly connect the stem portion and the one or more branch portions without including a join between the sleeve and the one or more branch portions. FIG. 10 shows an exploded view of an arm that includes a direct connection between a stem portion and one or more branch portions without including a joint. The arm permits formation of a water tight seal and/or an air tight seal without including a seal. The stem portion can be connected to a y-joint 1001. Any description herein of a y-joint may apply to any other type or shape of joint that may support any number of branches. In some cases, the stem portion can be integrated with the y-joint. Alternatively, the y-joint can be a separate piece from the stem and the stem can be connected to the y-joint. The y-joint can comprise one or more threaded extensions.

The one or more branch portions can be threaded on at least a portion of one of their ends. A threaded sleeve 1003 can be provided to connect each branch portion to each of the corresponding threaded extensions. In some cases, each of the threaded sleeves can be permanently strung along the length of a corresponding branch portion. Alternatively, the sleeves can be separable from the branch portions. The sleeves can be rotatable about the length of the branch portion and the threaded extension. The sleeves can have threads on their inner surface. The threads on the inner surface of the sleeves can be complementary to the threads on the threaded extension and the threaded portion of the end of each corresponding branch portion. In some cases, the arm and branch portion can be connected directly without including a sleeve. At least a portion of the branch portion can be fitted into the stem portion. At least a portion of the branch portion can be fitted over the stem portion. The stem portion and the branch portion can be threaded together. The stem portion and the branch portion can be connected by a hole and pin connection.

One or more brackets 1002 can be provided to permit rotation of the one or more branch portions relative to the stem portion. In some cases, the bracket can comprise a c-shaped bracket, a cable, a flexible tether, or a rod. The bracket can be rigid. The bracket can be flexible in one or more axis. The bracket can be semi-rigid. The bracket can permit the branch portion to move relative to the stem portion. The bracket can remain in the same horizontal place as the stem portion as the UAV is transformed from a compacted state to an extended state. The bracket may or may not permit vertical variation of the branch portion relative to the stem portion. The bracket can be connected on one side to the y-joint. On an opposite side, the bracket can be connected to a corresponding branch portion. The bracket may keep the corresponding branch portion connected to the joint. The bracket can pivot about the point where it is connected to the y-joint. In some cases, the bracket can also pivot about the point where it is connected to the corresponding branch portion. The bracket can permit the one or more branch portions to move laterally in a horizontal and/or vertical direction relative to the stem portion. The bracket can permit the one or more branch portions to rotate/change orientation relative to the stem portion.

In some cases, rotation of the rotors can naturally pull air downward which can creates a negative pressure in the central body. The negative pressure can cause air to be sucked in through a vent provided on the central body. The suction of the air into the central body can occur naturally and may be unforced. In some cases, the suction can be forced by a negative pressure source such as a vacuum. In some cases, the air that is sucked into the central body can provide cooling to one or more components of the UAV such as rotors and/or electronic components.

The UAV can provide fluid to the one or more rotors on the distal ends of the branch portions through the hollow arms of the UAV. The fluid can be ambient air that is sucked into the UAV passively or by a forced negative pressure gradient. The fluid can be provided to cool the one or more rotors during operation of the UAV to prevent the rotors from overheating. When the rotors over heat they can break down which can cause the UAV to lose control of its location and/or crash. In some cases, the fluid is a refrigerant provided to the rotors through a closed loop heat exchanger system. In some cases, the fluid is air. The air can be air taken from an ambient environment surrounding the UAV. The air can be cooled and/or filtered prior to delivering the air to the one or more rotors. The UAV can comprise an air suction system with one or more chillers and/or filter provided to cool and purify the air prior to delivering the air to the one or more rotors.

Figure 11:
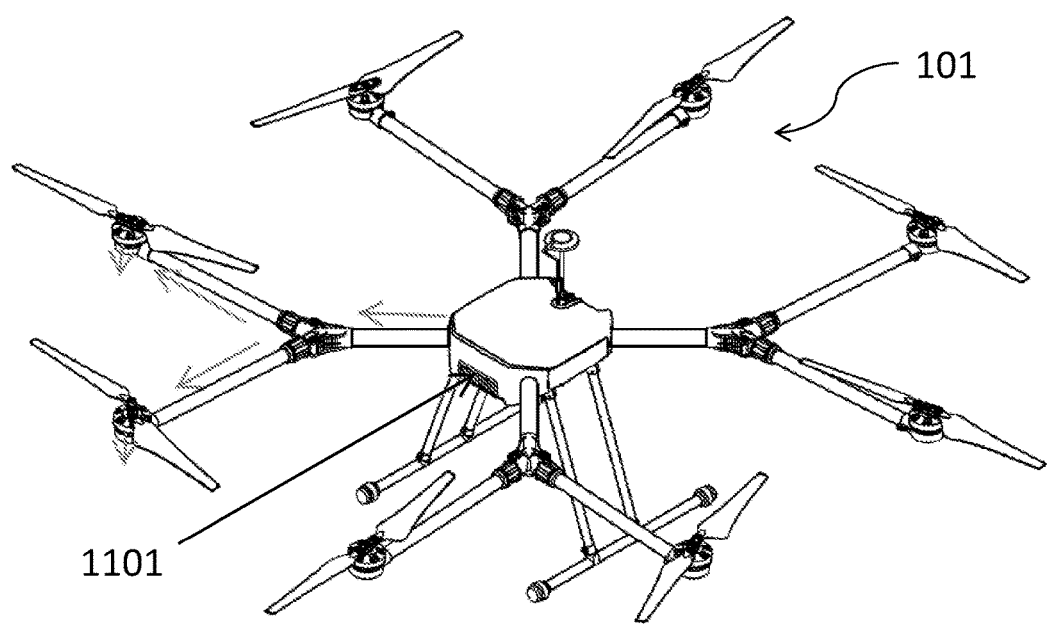
FIG. 11 shows a UAV with an air suction system configured to circulate treated air to one or more propulsion systems of the UAV.

FIG. 11 shows a UAV with the air suction system 1101. The air suction system can be housed in the body of the UAV. The air suction system can pull air into the UAV. The air suction system can comprise a negative pressure source such as a vacuum pump. The air suction system can pull air into the UAV at a constant or variable rate.

The air suction system can filter and chill the air that is pulled into the UAV. The air suction system can filter and heat air that is pulled into the UAV. The air suction system can comprise one or more filters. The filters can be configured to remove particulates from the air. The filters can include one or more high efficiency particle arrestance (HEPA) filters. The filters can include one or more fiber glass filters. The filters can be disposable. The filters can be replaceable. The filters can be reusable. The filters can be washable. The air suction system can comprise one or more chillers configured to decrease the temperature of air that is pulled into the UAV. The chiller can be a heat exchanger. The heat exchanger can decrease the temperature of the air by conduction and/or convection. The chiller can decrease the temperature of the air to a predetermined temperature.

After the air is chilled or heated and/or filtered the air can be provided to the one or more rotors to cool or heat the rotors and prevent the rotors from overheating or overcooling respectively. In some systems, the rotors can be exposed to ambient air and cooled by ambient air. In the UAV provided herein, the rotors can be sealed off from ambient air such that liquids and particulates present in the ambient air do not contact the rotor. As described herein, the air can be routed from the body of the UAV to the one or more rotors through the UAV arm which includes the stem and one or more branch portions. An interior space between the stem portion and the one or more branch portions can be sealed from the ambient by one or more of the sealing methods described herein. Sealing the interior space between the stem portion and the one or more branch portions can prevent outside dust and/or liquids from contaminating the air that has been purified and chilled by the air suction system. The air delivered to the one or more rotors can be chilled and free of particulates.

The arms of the UAV can be configured to provide fluid to the one or more rotors of the one or more propulsion units. The fluid can be the chilled or heated air. The fluid can be filtered air. In some cases, the fluid can be a liquid such as water or a refrigerant. The arms can comprise internal passageways configured to route the fluid from the central body of the UAV to the one or more rotors. The one or more rotors can be supported by the arm. The one or more rotors can be attached to a distal end of the arm. The one or more rotors can be attached to a distal end of the branch portion.

Figure 17:
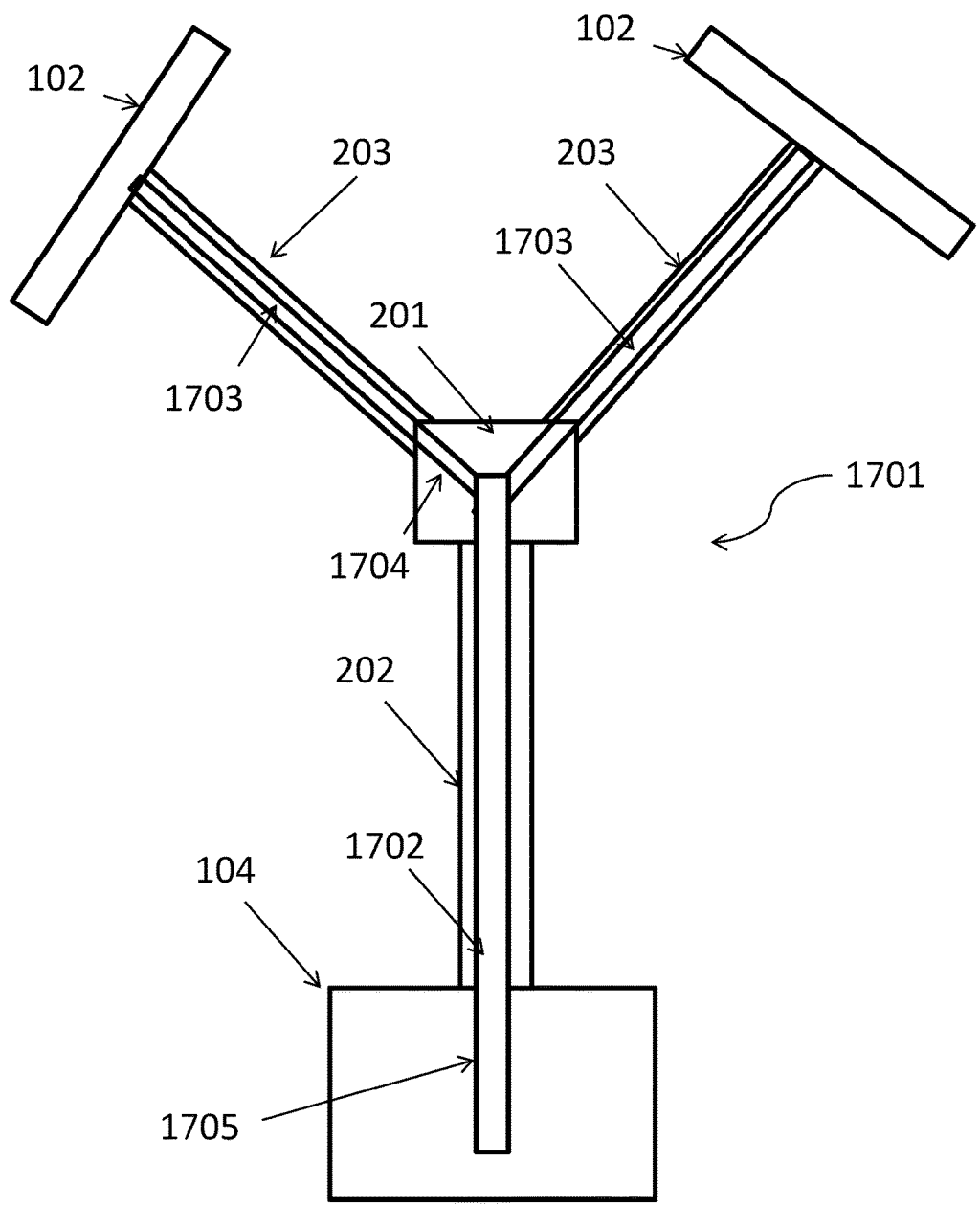
FIG. 17 shows an arm of the UAV that includes interior spaces for routing of fluid.

FIG. 17 shows an arm 1701 configured to provide fluid to the one or more rotors of the one or more propulsion units 1701. The arm can comprise a stem portion 202. The stem portion can have one or more interior spaces 1702. The arm can also have two or more branch portions 203 connected to the stem portion by a joint 201. The one or more branch portions can comprise an interior space 1703. The interior space of the stem portion and the interior space of the branch portion can be in fluid communication through an interior space of the joint 1704.

The stem portion can be hollow and the hollow portion of the stem portion form the interior space. The stem portion can comprise two or more hollow tubes to form the interior space. The stem portion can be porous and the pores can form the interior space. In some cases, the pores can filter the fluid passing through the interior space of the stem portion. The interior space can be sealed from ambient air. The interior space can be open to ambient air and configured to entrain ambient air. The interior space can comprise one or more diffusers. The interior space can comprise flow laminizers or turbulence generators.

The one or more branch portions can be hollow and the hollow portion of the one or more branch portions can form the interior space. The one or more branch portions can comprise two or more hollow tubes to form the interior space. The one or more branch portions can be porous and the pores can form the interior space. In some cases, the pores can filter the fluid passing through the interior space of the one or more branch portions. The interior space can be sealed from ambient air. The interior space can be open to ambient air and configured to entrain ambient air. The interior space can comprise one or more diffusers. The interior space can comprise flow laminizers or turbulence generators.

The joint can be hollow and the hollow portion of the joint can form the interior space. The joint can comprise two or more hollow tubes to form the interior space. The joint can be porous and the pores can form the interior space. In some cases, the pores can filter the fluid passing through the interior space of the joint. The interior space can be sealed from ambient air. The interior space can be open to ambient air and configured to entrain ambient air. The interior space can comprise one or more diffusers. The interior space can comprise flow laminizers or turbulence generators.

Fluid can flow from the central body of the UAV 104 to one or more motors configured to drive the rotors of the propulsion system. Alternatively or additionally, fluid can flow from one or more motors configured to drive the rotors of the propulsion system to the central body of the UAV 104. Fluid flow may not be permitted when the UAV is in a compacted state. The central body can include an interior space 1705. The central body interior space can convey fluid from the central body to the stem portion interior space. Flow from the central body to the stem portion can be passive or forced. Flow from the stem portion to the joint can be passive or forced. Flow from the joint to the branch portion can be passive or forced. Fluid flow from the branch portion to the propulsion unit can be passive or forced. In some cases the central body can comprise a fan that aids in conveying flow from the central body to the stem portion. The central body can comprise a fan that aid in conveying flow to the one or more branch portions. The central body can comprise a vent that permits fluid to flow into the interior space of the central body.

Figure 19:
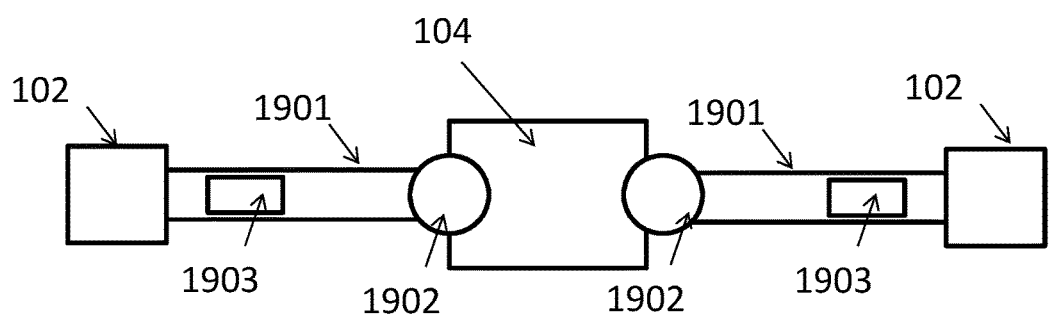
FIG. 19 shows a UAV with a plurality of arms in fluid communication with the central body of the UAV.

In some cases, an arm of the UAV may or may not include the one or more branch portions. An arm of the UAV can include only a stem portion. An arm of the UAV can include only a branch portion. An arm of the UAV may or may not be segmented into two or more portions. FIG. 19 shows a UAV with a central body 104. One or more arms 1901 can extend from the central body. The one or more arms can be attached to the central body by a joint 1902. One or more components 1903 can be housed in the arm. The joint can have any of the characteristics of the joints described herein. The arms can be moveable relative to the central body. The arms can translate relative to the central body. The arms can rotate relative to the central body. The arms can move horizontally relative to the central body. The arms can move vertically relative to the central body. The arms can be moved from an extended state to a compacted state as described herein.

The one or more arms can be in fluid communication with the body as described herein. The one or more arms can comprise a hollow space to permit fluid communication. The hollow space can have the characteristics described herein. In some cases, the arm may be in fluid communication with the central body but not with one or more propulsion units 102 attached to the arm. In some cases, fluid can be forced from the central body to one or more components 1903 in the one or more arms. The fluid can cool or heat the one or more components. The fluid can be gas and/or liquid. The fluid can be air. In some cases, the one or more components can be electrical components. The one or more components can include controllers, sensors, memory storage, processors, or any other component on-board the UAV. In some cases, the components can include an electronic speed control unit (ESC). The electronic speed control unit can be in communication with one or more motors provided on the propulsion unit. The electronic speed control unit can vary the speed of the one or more motors. One or more fans can be provided in the central body of the UAV and/or in the arms of the UAV to force fluid flow from the central body of the UAV to the arms. In some cases, the fan can be mounted on the arm.

Figure 20:
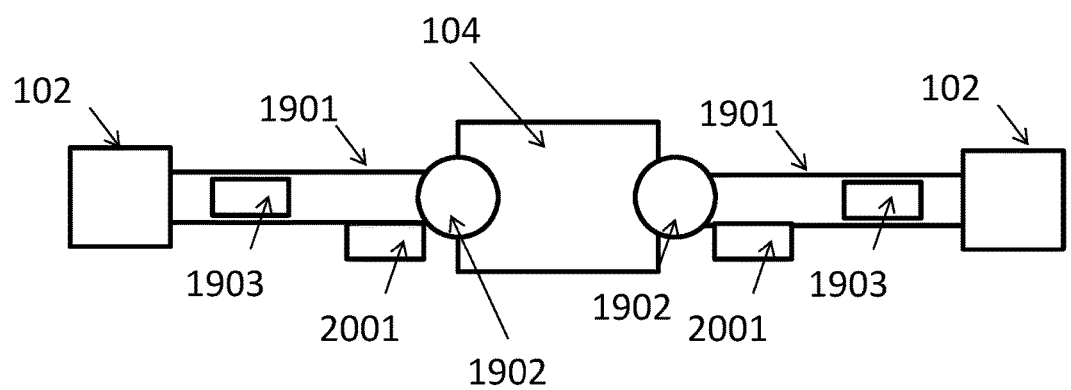
FIG. 20 shows a UAV with a plurality of arms in fluid communication with the central body of the UAV with devices to drive fluid flow within the arms.

Fluid can be forced to flow through the arm by a source of negative or positive pressure configured to drive fluid flow. In some cases, the device configured to drive fluid flow can be a fan, a pump, an actuator, or any other powered device that generates a pressure differential. The driven flow can be forced. The driven flow may or may not occur naturally. The driven flow may or may not occur passively. The driven flow can occur in a direction opposite a naturally occurring pressure gradient. The device 2001 can be mounted to the arm as shown in FIG. 20. Alternatively the device can be attached to or housed in the propulsion unit and/or the central body of the UAV. Flow can be forced from the central body of the UAV to at least a portion of the arm. Flow can travel from the central body of the UAV to a distance that is about 10%, 20%, 30%, 40%, 50%, 60%, 70%, 80%, 90%, or 100 of the length of the arm. The distance can be less than 10% of the length of the arm. The flow can travel from the arm to the propulsion unit. The flow can travel from a first location on the length of the arm to a second location on the length of the arm. The flow may or may not enter the central body of the UAV. The flow may or may not reach the propulsion unit.

Figure 21:
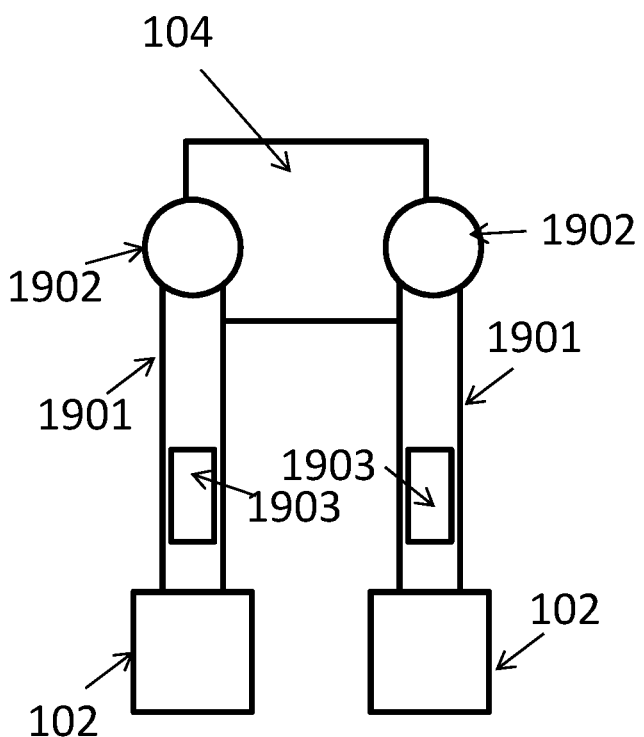
FIG. 21 shows a UAV with a plurality of arms in fluid communication with the central body of the UAV in a compacted state.

The one or more arms can be movable relative to the central body of the UAV. The arms can be moveable relative to the central body. The arms can translate relative to the central body. The arms can rotate relative to the central body. The arms can move horizontally relative to the central body. The arms can move vertically relative to the central body. The arms can be moved from an extended state to a compacted state as described herein. FIG. 21 shows a UAV with a plurality of arms in a compacted state. The arms can be collinear in an extended state. The arms can be parallel in a compacted state.

In some cases, one or more of the components of the UAV described herein can be provided in a kit for assembling a UAV. The kit can be assembled by a user. The kit can be a "do it yourself" (DIY) kit. The kit can comprise a plurality of arms including one or more stem portions and one or more branch portions. The kit can include one or more joints for connecting the stem portions with the one or more branch portions. The joints can permit the one or more branch portions to move relative to the one or more stem portions. The kit can include instructions for building one or more types of UAVs. The kit can include instructions for the user to assemble the components such that when assembled by the user the UAV has a central body and a plurality of arms that extend from the central body. The user can choose to vary the number of arms. Each arm can have one or more joints segment the arm into a stem portion proximal to the central body and one or more branch portions distal to the central body. The one or more joints can permit the one or more branch portions to move relative to the stem portion as described elsewhere herein. The assembled UAV can also have a plurality of rotors, each rotor attached to the one or more joint portions.

The systems, devices, and methods described herein can be applied to a wide variety of movable objects. As previously mentioned, any description herein of an aerial vehicle, such as a UAV, may apply to and be used for any movable object. Any description herein of an aerial vehicle may apply specifically to UAVs. A movable object of the present disclosure can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be carried by a living subject, or take off from a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be an aerial vehicle. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). An aerial vehicle can be self-propelled, such as self-propelled through the air. A self-propelled aerial vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. The movable object may be controlled remotely via an occupant within a separate vehicle. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of a size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 cm3, 2 cm3, 5 cm3, 10 cm3, 20 cm3, 30 cm3, 40 cm3, 50 cm3, 60 cm3, 70 cm3, 80 cm3, 90 cm3, 100 cm3, 150 cm3, 200 cm3, 300 cm3, 500 cm3, 750 cm3, 1000 cm3, 5000 cm3, 10,000 cm3, 100,000 cm33, 1 m3, or 10 m3. Conversely, the total volume of the movable object may be greater than or equal to about: 1 cm3, 2 cm3, 5 cm3, 10 cm3, 20 cm3, 30 cm3, 40 cm3, 50 cm3, 60 cm3, 70 cm3, 80 cm3, 90 cm3, 100 cm3, 150 cm3, 200 cm3, 300 cm3, 500 cm3, 750 cm3, 1000 cm3, 5000 cm3, 10,000 cm3, 100,000 cm3, 1 m3, or 10 m3.

In some embodiments, the movable object may have a footprint (which may refer to the lateral cross-sectional area encompassed by the movable object) less than or equal to about: 32,000 cm2, 20,000 cm2, 10,000 cm2, 1,000 cm2, 500 cm2, 100 cm2, 50 cm2, 10 cm2, or 5 cm2. Conversely, the footprint may be greater than or equal to about: 32,000 cm2, 20,000 cm2, 10,000 cm2, 1,000 cm2, 500 cm2, 100 cm2, 50 cm2, 10 cm2, or 5 cm2.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail elsewhere herein. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 12:
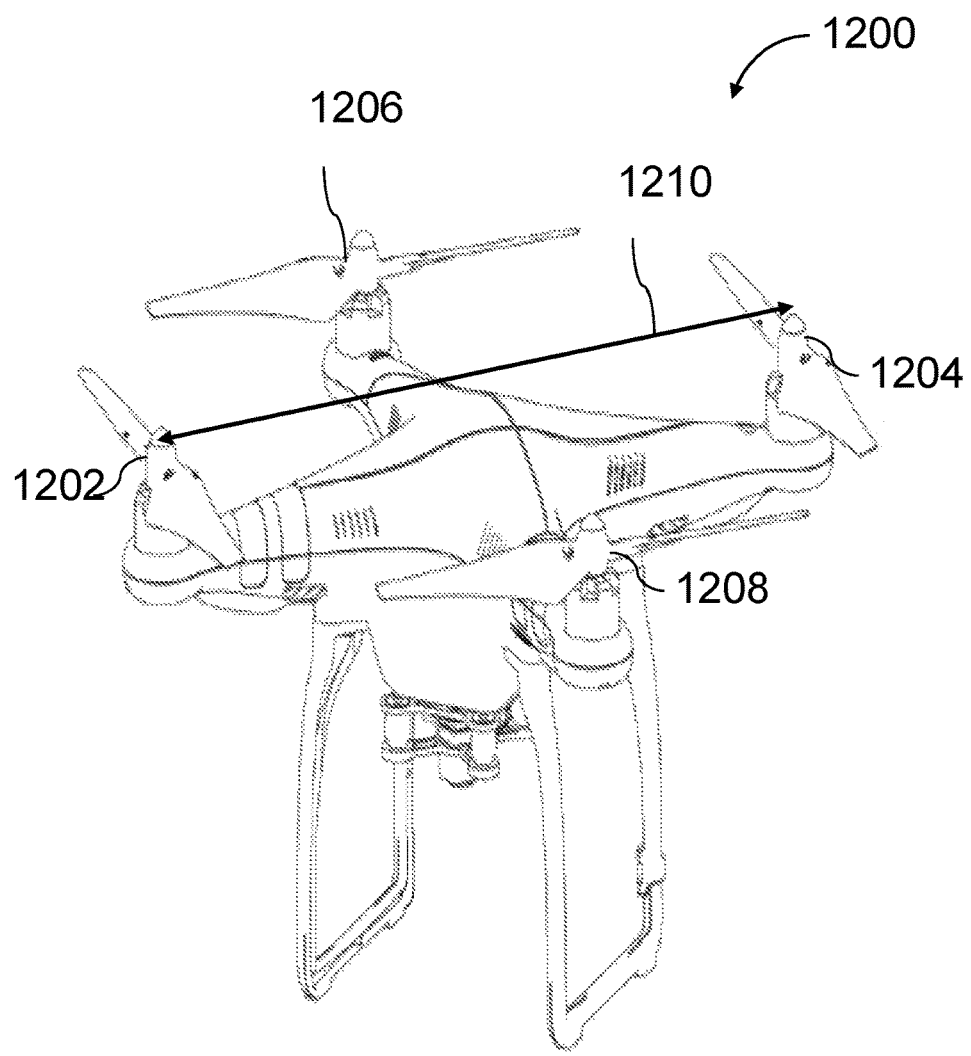
FIG. 12 illustrates an unmanned aerial vehicle, in accordance with an embodiment of the disclosure.

FIG. 12 illustrates an unmanned aerial vehicle (UAV) 1200, in accordance with embodiments of the present disclosure. The UAV may be an example of a movable object as described herein. The UAV 1200 can include a propulsion system having four rotors 1202, 1204, 1206, and 1208. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 1210. For example, the length 1210 can be less than or equal to 2 m, or less than equal to 5 m. In some embodiments, the length 1210 can be within a range from 40 cm to 1 m, from 10 cm to 2 m, or from 5 cm to 5 m. Any description herein of a UAV may apply to a movable object, such as a movable object of a different type, and vice versa. The UAV may use an assisted takeoff system or method as described herein.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object). The load can include a payload and/or a carrier, as described elsewhere herein.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 13:
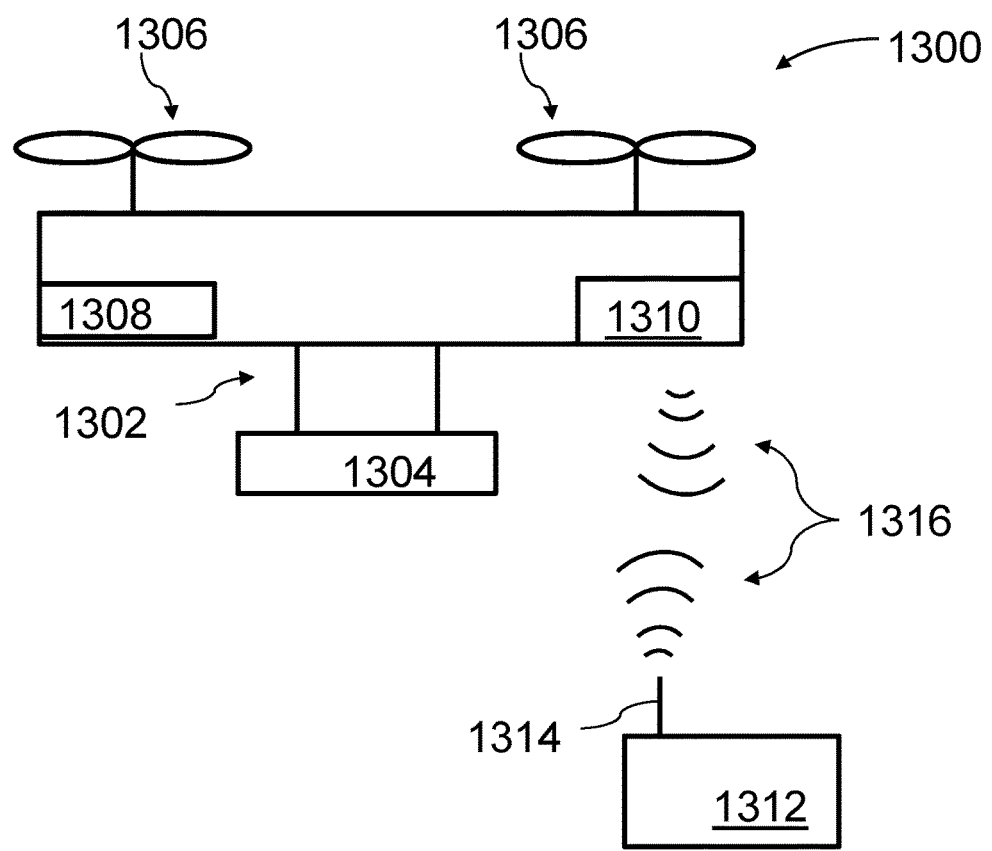
FIG. 13 illustrates a movable object including a carrier and a payload, in accordance with an embodiment of the disclosure.

FIG. 13 illustrates a movable object 1300 including a carrier 1302 and a payload 1304, in accordance with embodiments. Although the movable object 1300 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., a UAV). In some instances, the payload 1304 may be provided on the movable object 1300 without requiring the carrier 1302. The movable object 1300 may include propulsion mechanisms 1306, a sensing system 1308, and a communication system 1310.

The propulsion mechanisms 1306 can include one or more of rotors, propellers, blades, engines, motors, wheels, axles, magnets, or nozzles, as previously described. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1306 can be mounted on the movable object 1300 using any suitable means, such as a support element (e.g., a drive shaft) as described elsewhere herein. The propulsion mechanisms 1306 can be mounted on any suitable portion of the movable object 1300, such on the top, bottom, front, back, sides, or suitable combinations thereof.

In some embodiments, the propulsion mechanisms 1306 can enable the movable object 1300 to take off vertically from a surface or land vertically on a surface without requiring any horizontal movement of the movable object 1300 (e.g., without traveling down a runway). Optionally, the propulsion mechanisms 1306 can be operable to permit the movable object 1300 to hover in the air at a specified position and/or orientation. One or more of the propulsion mechanisms 1306 may be controlled independently of the other propulsion mechanisms. Alternatively, the propulsion mechanisms 1306 can be configured to be controlled simultaneously. For example, the movable object 1300 can have multiple horizontally oriented rotors that can provide lift and/or thrust to the movable object. The multiple horizontally oriented rotors can be actuated to provide vertical takeoff, vertical landing, and hovering capabilities to the movable object 1200. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1300 (e.g., with respect to up to three degrees of translation and up to three degrees of rotation).

The sensing system 1308 can include one or more sensors that may sense the spatial disposition, velocity, and/or acceleration of the movable object 1300 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1308 can be used to control the spatial disposition, velocity, and/or orientation of the movable object 1300 (e.g., using a suitable processing unit and/or control module, as described below). Alternatively, the sensing system 1308 can be used to provide data regarding the environment surrounding the movable object, such as weather conditions, proximity to potential obstacles, location of geographical features, location of manmade structures, and the like.

The communication system 1310 enables communication with terminal 1312 having a communication system 1314 via wireless signals 1316. The communication systems 1310, 1314 may include any number of transmitters, receivers, and/or transceivers suitable for wireless communication. The communication may be one-way communication, such that data can be transmitted in only one direction. For example, one-way communication may involve only the movable object 1300 transmitting data to the terminal 1312, or vice-versa. The data may be transmitted from one or more transmitters of the communication system 1310 to one or more receivers of the communication system 1312, or vice-versa. Alternatively, the communication may be two-way communication, such that data can be transmitted in both directions between the movable object 1300 and the terminal 1312. The two-way communication can involve transmitting data from one or more transmitters of the communication system 1310 to one or more receivers of the communication system 1314, and vice-versa.

In some embodiments, the terminal 1312 can provide control data to one or more of the movable object 1300, carrier 1302, and payload 1304 and receive information from one or more of the movable object 1300, carrier 1302, and payload 1304 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1306), or a movement of the payload with respect to the movable object (e.g., via control of the carrier 1302). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1308 or of the payload 1304). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1312 can be configured to control a state of one or more of the movable object 1300, carrier 1302, or payload 1304. Alternatively or in combination, the carrier 1302 and payload 1304 can also each include a communication module configured to communicate with terminal 1312, such that the terminal can communicate with and control each of the movable object 1300, carrier 1302, and payload 1304 independently.

In some embodiments, the movable object 1300 can be configured to communicate with another remote device in addition to the terminal 1312, or instead of the terminal 1312. The terminal 1312 may also be configured to communicate with another remote device as well as the movable object 1300. For example, the movable object 1300 and/or terminal 1312 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1300, receive data from the movable object 1300, transmit data to the terminal 1312, and/or receive data from the terminal 1312. Optionally, the remote device can be connected to the Internet or other telecommunications network, such that data received from the movable object 1300 and/or terminal 1312 can be uploaded to a website or server.

Figure 14:
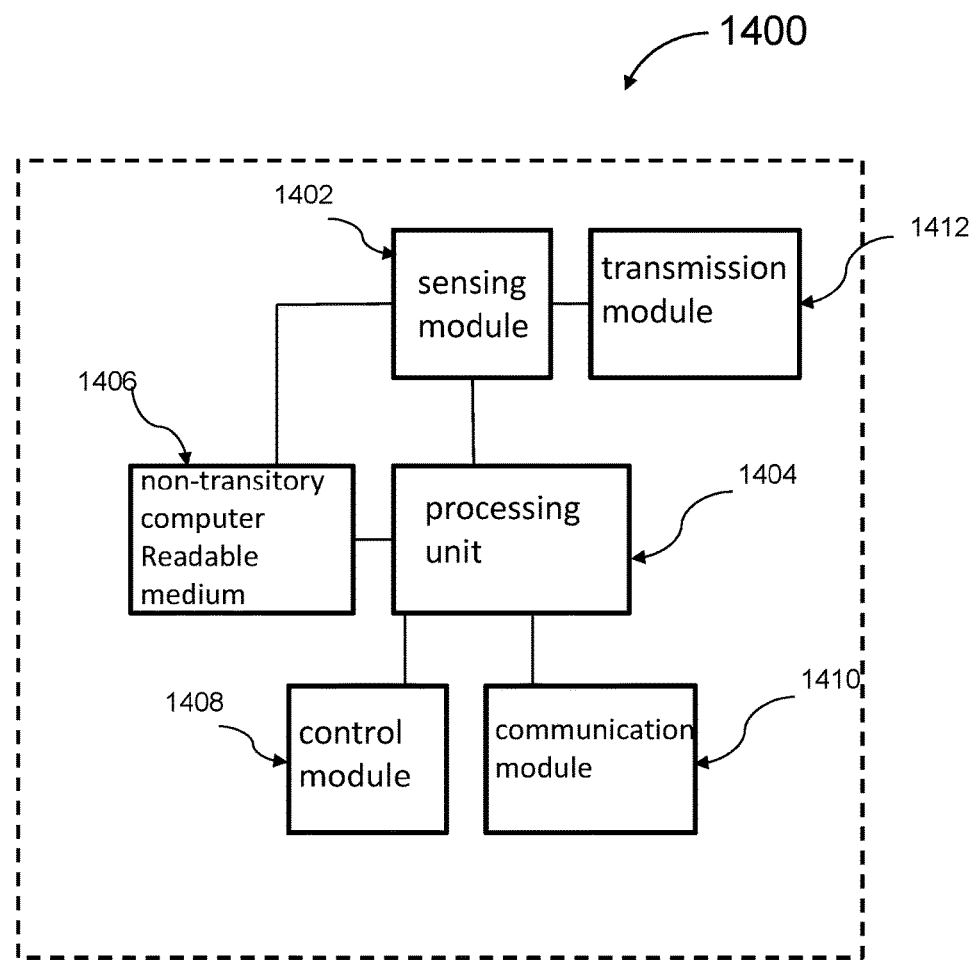
FIG. 14 is a schematic illustration by way of block diagram of a system for controlling a movable object, in accordance with an embodiment of the disclosure.

FIG. 14 is a schematic illustration by way of block diagram of a system 1400 for controlling a movable object, in accordance with embodiments. The system 1400 can be used in combination with any suitable embodiment of the systems, devices, and methods disclosed herein. The system 1400 can include a sensing module 1402, processing unit 1404, non-transitory computer readable medium 1406, control module 1408, and communication module 1410.

The sensing module 1402 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1402 can be operatively coupled to a processing unit 1404 having a plurality of processors. In some embodiments, the sensing module can be operatively coupled to a transmission module 1412 (e.g., a Wi-Fi image transmission module) configured to directly transmit sensing data to a suitable external device or system. For example, the transmission module 1412 can be used to transmit images captured by a camera of the sensing module 1402 to a remote terminal.

The processing unit 1404 can have one or more processors, such as a programmable processor (e.g., a central processing unit (CPU)). The processing unit 1404 can be operatively coupled to a non-transitory computer readable medium 1406. The non-transitory computer readable medium 1406 can store logic, code, and/or program instructions executable by the processing unit 1404 for performing one or more steps. The non-transitory computer readable medium can include one or more memory units (e.g., removable media or external storage such as an SD card or random access memory (RAM)). In some embodiments, data from the sensing module 1402 can be directly conveyed to and stored within the memory units of the non-transitory computer readable medium 1406. The memory units of the non-transitory computer readable medium 1406 can store logic, code and/or program instructions executable by the processing unit 1404 to perform any suitable embodiment of the methods described herein. For example, the processing unit 1404 can be configured to execute instructions causing one or more processors of the processing unit 1404 to analyze sensing data produced by the sensing module. The memory units can store sensing data from the sensing module to be processed by the processing unit 1404. In some embodiments, the memory units of the non-transitory computer readable medium 1406 can be used to store the processing results produced by the processing unit 1404.

In some embodiments, the processing unit 1404 can be operatively coupled to a control module 1408 configured to control a state of the movable object. For example, the control module 1408 can be configured to control the propulsion mechanisms of the movable object to adjust the spatial disposition, velocity, and/or acceleration of the movable object with respect to six degrees of freedom. Alternatively or in combination, the control module 1408 can control one or more of a state of a carrier, payload, or sensing module.

The processing unit 1404 can be operatively coupled to a communication module 1410 configured to transmit and/or receive data from one or more external devices (e.g., a terminal, display device, or other remote controller). Any suitable means of communication can be used, such as wired communication or wireless communication. For example, the communication module 1410 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1410 can transmit and/or receive one or more of sensing data from the sensing module 1402, processing results produced by the processing unit 1404, predetermined control data, user commands from a terminal or remote controller, and the like.

The components of the system 1400 can be arranged in any suitable configuration. For example, one or more of the components of the system 1400 can be located on the movable object, carrier, payload, terminal, sensing system, or an additional external device in communication with one or more of the above. Additionally, although FIG. 14 depicts a single processing unit 1404 and a single non-transitory computer readable medium 1406, one of skill in the art would appreciate that this is not intended to be limiting, and that the system 1400 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1400 can occur at one or more of the aforementioned locations.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the invention and that methods and structures within the scope of these claims and their equivalents be covered thereby.

What is claimed is:

1. An unmanned aerial vehicle (UAV) comprising:
   a central body;
   a plurality of arms extending out from the central body, each of the plurality of arms including:
   a stem portion;
   one or more branch portions; and
   a joint connecting the stem portion with the one or more branch portions, the joint including a sleeve configured to lock a position of one of the one or more branch portions relative to the stem portion and wherein the joint is configured to permit the one or more branch portions to pivot with respect to the stem portion; and
   a plurality of propulsion units each attached to one of the one or more branch portions of one of the plurality of arms.

2. The UAV of claim 1, wherein the sleeve includes a cylindrical cap surrounding at least one of an extension of the joint or the one of the one or more branch portions.

3. The UAV of claim 1, wherein the sleeve is coaxial with at least one of an extension of the joint or the one of the one or more branch portions.

4. The UAV of claim 1, wherein the sleeve is configured to slide along at least one of a longitudinal axis of an extension of the joint or a longitudinal axis of the one of the one or more branch portions.

5. The UAV of claim 1, wherein the sleeve covers at least one of a portion of an end of the one of the one or more branch portions or a portion of an end of the joint.

6. The UAV of claim 1, wherein:
   the sleeve includes a first mating feature; and
   the joint further includes a second mating feature arranged at an extension of the joint and configured to mate with the first mating feature.

7. The UAV of claim 6, wherein at least one of the first mating feature or the second mating feature includes a threaded interface.

8. The UAV of claim 6, wherein:
   one of the first mating feature and the second mating feature includes a guide; and
   another one of the first mating feature and the second mating feature includes a protrusion.

9. The UAV of claim 1, wherein the sleeve isolates at least one of an inner portion of the joint, an interface between the joint and the one of the one or more branch portions, or a channel formed in an interior of the one of the one or more branch portions and/or the joint from an ambient environment.

10. The UAV of claim 1, wherein the joint is configured to permit the one or more branch portions to move horizontally relative to the stem portion between an extended state and a compacted state.

11. An arm configured to support a propulsion unit of an unmanned aerial vehicle (UAV), comprising:
a stem portion;
one or more branch portions connected to the propulsion unit; and
a joint connecting the stem portion with the one or more branch portions, the joint including a sleeve configured to lock a position of one of the one or more branch portions relative to the stem portion, and wherein the joint is configured to permit the one or more branch portions to pivot with respect to the stem portion.

12. The arm of claim 11, wherein the sleeve includes a cylindrical cap surrounding at least one of an extension of the joint or the one of the one or more branch portions.

13. The arm of claim 11, wherein the sleeve is coaxial with at least one of an extension of the joint or the one of the one or more branch portions.

14. The arm of claim 11, wherein the sleeve is configured to slide along at least one of a longitudinal axis of an extension of the joint or a longitudinal axis of the one of the one or more branch portions.

15. The arm of claim 11, wherein the sleeve covers at least one of a portion of an end of the one of the one or more branch portions or a portion of an end of the joint.

16. The arm of claim 11, wherein:
the sleeve includes a first mating feature; and
the joint further includes a second mating feature arranged at an extension of the joint and configured to mate with the first mating feature.

17. The arm of claim 16, wherein at least one of the first mating feature or the second mating feature includes a threaded interface.

18. The arm of claim 16, wherein:
one of the first mating feature and the second mating feature includes a guide; and
another one of the first mating feature and the second mating feature includes a protrusion.

19. The arm of claim 11, wherein the sleeve isolates at least one of an inner portion of the joint, an interface between the joint and the one of the one or more branch portions, or a channel formed in an interior of the one of the one or more branch portions and/or the joint from an ambient environment.

20. The arm of claim 11, wherein the joint is configured to permit the one or more branch portions to move horizontally relative to the stem portion between an extended state and a compacted state.

* * * * *